US010735057B1

(12) United States Patent
Zhao et al.

(10) Patent No.: US 10,735,057 B1
(45) Date of Patent: Aug. 4, 2020

(54) UPLINK USER EQUIPMENT SELECTION

(71) Applicant: XCOM Labs, Inc., San Diego, CA (US)

(72) Inventors: Wanlun Zhao, San Diego, CA (US); Jinghu Chen, San Diego, CA (US); Tamer Adel Kadous, San Diego, CA (US); Michael Mingxi Fan, San Diego, CA (US); Peter John Black, La Jolla, CA (US)

(73) Assignee: XCOM Labs, Inc., San Diego, CA (US)

( * ) Notice: Subject to any disclaimer, the term of this patent is extended or adjusted under 35 U.S.C. 154(b) by 0 days.

(21) Appl. No.: 16/397,958

(22) Filed: Apr. 29, 2019

(51) Int. Cl.
*H04L 5/12* (2006.01)
*H04B 7/0452* (2017.01)
*H04B 7/06* (2006.01)
*H04W 72/04* (2009.01)

(52) U.S. Cl.
CPC ......... *H04B 7/0452* (2013.01); *H04B 7/0697* (2013.01); *H04W 72/046* (2013.01); *H04W 72/0446* (2013.01)

(58) Field of Classification Search
CPC . H04B 7/0452; H04B 7/0697; H04W 72/046; H04W 72/0446
See application file for complete search history.

(56) References Cited

U.S. PATENT DOCUMENTS

| 170,026 A | 11/1875 | Springsteen |
|---|---|---|
| 5,469,115 A | 11/1995 | Peterzell |
| 5,617,060 A | 4/1997 | Wilson |
| 5,757,858 A | 5/1998 | Black |
| 5,870,431 A | 2/1999 | Easton |
| 6,006,108 A | 12/1999 | Black |
| 6,107,878 A | 8/2000 | Black |
| 6,134,440 A | 10/2000 | Black |
| 6,147,964 A | 11/2000 | Black |
| 6,181,201 B1 | 1/2001 | Black |

(Continued)

OTHER PUBLICATIONS

Liu, et al., Low-Complexity Downlink User Selection for Massive MIMO Systems, IEEE Systems Journal, pp. 1-11, Apr. 2015.

(Continued)

*Primary Examiner* — Dhaval V Patel
(74) *Attorney, Agent, or Firm* — Knobbe Martens Olson & Bear LLP

(57) ABSTRACT

Aspects of the disclosure relate to a selection scheme implemented by a scheduler in a multiple-input multiple-output (MIMO) network to identify which users to schedule simultaneously during the same time slot. For uplink communications and a particular frequency wholeband or sub-band, the scheduler can obtain uplink channel information for channels between base stations and UEs. The scheduler can then determine a strength of the channels using the uplink channel information, order the UEs using a fairness metric based on the channel strengths, and compute one or more QR decompositions to identify whether a spatial dimension of a UE is roughly or approximately orthogonal to spatial dimension(s) of other UEs selected to be served during a time slot being scheduled. If the spatial dimensions are roughly or approximately orthogonal, the scheduler selects the UE to be served at the same time as other UEs already selected.

20 Claims, 11 Drawing Sheets

(56) References Cited

U.S. PATENT DOCUMENTS

| | | |
|---|---|---|
| 6,205,129 B1 | 3/2001 | Esteves |
| 6,208,873 B1 | 3/2001 | Black |
| 6,246,885 B1 | 6/2001 | Black |
| 6,285,861 B1 | 9/2001 | Bonaccorso |
| 6,363,102 B1 | 3/2002 | Ling |
| 6,397,070 B1 | 5/2002 | Black |
| 6,426,971 B1 | 7/2002 | Wu |
| 6,434,376 B1 | 8/2002 | Black |
| 6,449,490 B1 | 9/2002 | Chaponniere |
| 6,560,211 B2 | 5/2003 | Esteves |
| 6,574,211 B2 | 6/2003 | Padovani |
| 6,594,501 B2 | 7/2003 | Black |
| 6,633,552 B1 | 10/2003 | Ling |
| 6,636,568 B2 | 10/2003 | Kadous |
| 6,661,833 B1 | 12/2003 | Black |
| 6,678,257 B1 | 1/2004 | Vijayan |
| 6,680,925 B2 | 1/2004 | Wu |
| 6,680,968 B2 | 1/2004 | Black |
| 6,687,510 B2 | 2/2004 | Esteves |
| 6,693,920 B2 | 2/2004 | Montojo |
| 6,694,469 B1 | 2/2004 | Jalali |
| 6,714,526 B2 | 3/2004 | Wei |
| 6,725,028 B2 | 4/2004 | Bonaccorso |
| 6,738,608 B2 | 5/2004 | Black |
| 6,748,201 B2 | 6/2004 | Black |
| 6,757,520 B2 | 6/2004 | Attar |
| 6,798,736 B1 | 9/2004 | Black |
| 6,801,580 B2 | 10/2004 | Kadous |
| 6,813,478 B2 | 11/2004 | Glazko |
| 6,873,606 B2 | 3/2005 | Agrawal |
| 6,894,994 B1 | 5/2005 | Grob |
| 6,917,821 B2 | 7/2005 | Kadous |
| 6,920,504 B2 | 7/2005 | Bender |
| 6,928,062 B2 | 8/2005 | Krishnan |
| 6,985,516 B1 | 1/2006 | Easton |
| 6,987,778 B2 | 1/2006 | Sindhushayana |
| 7,010,073 B2 | 3/2006 | Black |
| 7,020,073 B2 | 3/2006 | Kadous |
| 7,020,225 B2 | 3/2006 | Sindhushayana |
| 7,039,001 B2 | 5/2006 | Krishnan |
| 7,042,857 B2 | 5/2006 | Krishnan |
| 7,051,268 B1 | 5/2006 | Sindhushayana |
| 7,068,707 B2 | 6/2006 | Bender |
| 7,069,037 B2 | 6/2006 | Lott |
| 7,072,628 B2 | 7/2006 | Agashe |
| 7,079,550 B2 | 7/2006 | Padovani |
| 7,088,701 B1 | 8/2006 | Attar |
| 7,088,957 B2 | 8/2006 | Ling |
| 7,095,790 B2 | 8/2006 | Krishnan |
| 7,106,782 B2 | 9/2006 | Howard |
| 7,123,922 B2 | 10/2006 | Chaponniere |
| 7,127,654 B2 | 10/2006 | Jalali |
| 7,130,282 B2 | 10/2006 | Black |
| 7,133,437 B2 | 11/2006 | Black |
| 7,145,940 B2 | 12/2006 | Gore |
| 7,149,264 B2 | 12/2006 | Black |
| 7,155,246 B2 | 12/2006 | Bhushan |
| 7,167,684 B2 | 1/2007 | Kadous |
| 7,177,351 B2 | 2/2007 | Kadous |
| 7,177,648 B2 | 2/2007 | Attar |
| 7,184,426 B2 | 2/2007 | Padovani |
| 7,184,713 B2 | 2/2007 | Kadous |
| 7,194,041 B2 | 3/2007 | Kadous |
| 7,206,580 B2 | 4/2007 | Black |
| 7,206,598 B2 | 4/2007 | Attar |
| 7,209,517 B2 | 4/2007 | Sindhushayana |
| 7,228,148 B2 | 6/2007 | Esteves |
| 7,236,535 B2 | 6/2007 | Subramaniam |
| 7,239,622 B2 | 7/2007 | Black |
| 7,239,847 B2 | 7/2007 | Attar |
| 7,251,229 B2 | 7/2007 | Montojo |
| 7,266,156 B2 | 9/2007 | Montojo |
| 7,289,473 B1 | 10/2007 | Padovani |
| 7,295,857 B2 | 11/2007 | Joshi |
| 7,315,531 B2 | 1/2008 | Black |
| 7,369,549 B2 | 5/2008 | Wu |
| 7,376,209 B2 | 5/2008 | Namgoong |
| 7,382,744 B2 | 6/2008 | Bhushan |
| 7,411,930 B2 | 8/2008 | Montojo |
| 7,418,046 B2 | 8/2008 | Gore |
| 7,428,269 B2 | 9/2008 | Sampath |
| 7,450,943 B2 | 11/2008 | Black |
| 7,457,639 B2 | 11/2008 | Subramaniam |
| 7,463,576 B2 | 12/2008 | Krishnan |
| 7,477,693 B2 | 1/2009 | Subramaniam |
| 7,499,427 B2 | 3/2009 | Padovani |
| 7,508,748 B2 | 3/2009 | Kadous |
| 7,525,909 B2 | 4/2009 | Fan |
| 7,564,775 B2 | 7/2009 | Jayaraman |
| 7,564,794 B2 | 7/2009 | Montojo |
| 7,564,818 B2 | 7/2009 | Black |
| 7,567,621 B2 | 7/2009 | Sampath |
| 7,580,709 B2 | 8/2009 | Black |
| 7,596,090 B2 | 9/2009 | Black |
| 7,606,326 B2 | 10/2009 | Krishnan |
| 7,609,773 B2 | 10/2009 | Bhushan |
| 7,613,978 B2 | 11/2009 | Jalali |
| 7,620,005 B2 | 11/2009 | Wei |
| 7,646,802 B2 | 1/2010 | Black |
| 7,668,125 B2 | 2/2010 | Kadous |
| 7,672,383 B2 | 3/2010 | Namgoong |
| 7,675,886 B2 | 3/2010 | Agrawal |
| 7,693,213 B2 | 4/2010 | Sindhushayana |
| 7,719,991 B2 | 5/2010 | Bhushan |
| 7,729,714 B2 | 6/2010 | Black |
| 7,738,906 B2 | 6/2010 | Attar |
| 7,742,447 B2 | 6/2010 | Joshi |
| 7,796,563 B2 | 9/2010 | Wu |
| 7,817,677 B2 | 10/2010 | Black |
| 7,817,760 B2 | 10/2010 | Black |
| 7,826,441 B2 | 11/2010 | Black |
| 7,830,900 B2 | 11/2010 | Black |
| 7,835,695 B2 | 11/2010 | Ling |
| 7,848,282 B2 | 12/2010 | Padovani |
| 7,848,283 B2 | 12/2010 | Padovani |
| 7,848,284 B2 | 12/2010 | Padovani |
| 7,848,285 B2 | 12/2010 | Padovani |
| 7,848,298 B2 | 12/2010 | Attar |
| 7,869,387 B2 | 1/2011 | Black |
| 7,876,265 B2 | 1/2011 | Black |
| 7,890,144 B2 | 2/2011 | Subramaniam |
| 7,893,873 B2 | 2/2011 | Black |
| 7,903,615 B2 | 3/2011 | Gorokhov |
| 7,924,753 B2 | 4/2011 | Attar |
| 7,940,663 B2 | 5/2011 | Kadous |
| 7,948,959 B2 | 5/2011 | Wang |
| 7,953,062 B2 | 5/2011 | Sindhushayana |
| 7,961,592 B2 | 6/2011 | Black |
| 7,974,359 B2 | 7/2011 | Gorokhov |
| 7,995,531 B2 | 8/2011 | Padovani |
| 7,995,684 B2 | 8/2011 | Montojo |
| 8,005,042 B2 | 8/2011 | Padovani |
| 8,009,625 B2 | 8/2011 | Padovani |
| 8,010,113 B2 | 8/2011 | Black |
| 8,014,331 B2 | 9/2011 | Sarkar |
| 8,040,942 B2 | 10/2011 | Bhushan |
| 8,050,198 B2 | 11/2011 | Bhushan |
| 8,073,068 B2 | 12/2011 | Kim |
| 8,077,654 B2 | 12/2011 | Sutivong |
| 8,077,655 B2 | 12/2011 | Padovani |
| 8,077,691 B2 | 12/2011 | Kadous |
| 8,085,678 B2 | 12/2011 | Spindola |
| 8,089,924 B2 | 1/2012 | Padovani |
| 8,094,623 B2 | 1/2012 | Attar |
| 8,094,740 B2 | 1/2012 | Bhushan |
| 8,098,635 B2 | 1/2012 | Montojo |
| 8,098,767 B2 | 1/2012 | Mirbagheri |
| 8,102,872 B2 | 1/2012 | Spindola |
| 8,107,517 B2 | 1/2012 | Naguib |
| 8,111,663 B2 | 2/2012 | Black |
| 8,116,283 B2 | 2/2012 | Black |
| 8,126,072 B2 | 2/2012 | Namgoong |
| 8,139,672 B2 | 3/2012 | Gore |
| 8,160,596 B2 | 4/2012 | Black |

(56) References Cited

U.S. PATENT DOCUMENTS

| | | |
|---|---|---|
| 8,165,619 B2 | 4/2012 | Attar |
| 8,175,594 B2 | 5/2012 | Attar |
| 8,189,540 B2 | 5/2012 | Padovani |
| 8,203,961 B2 | 6/2012 | Yavuz |
| 8,204,530 B2 | 6/2012 | Gorokhov |
| 8,213,390 B2 | 7/2012 | Black |
| 8,218,573 B2 | 7/2012 | Bhushan |
| 8,229,423 B2 | 7/2012 | Sarkar |
| 8,306,096 B2 | 11/2012 | Sampath |
| 8,311,027 B2 | 11/2012 | Padovani |
| 8,331,310 B2 | 12/2012 | Wang |
| 8,331,377 B2 | 12/2012 | Attar |
| 8,331,385 B2 | 12/2012 | Black |
| 8,331,892 B2 | 12/2012 | Kadous |
| 8,351,372 B2 | 1/2013 | Padovani |
| 8,351,456 B2 | 1/2013 | Kadous |
| 8,363,697 B2 | 1/2013 | Grob |
| 8,375,261 B2 | 2/2013 | Shi |
| 8,385,388 B2 | 2/2013 | Soriaga |
| 8,385,433 B2 | 2/2013 | Wang |
| 8,385,465 B2 | 2/2013 | Kadous |
| 8,385,923 B2 | 2/2013 | Attar |
| 8,391,196 B2 | 3/2013 | Gorokhov |
| 8,391,337 B2 | 3/2013 | Black |
| 8,391,413 B2 | 3/2013 | Mantravadi |
| 8,396,152 B2 | 3/2013 | Attar |
| 8,406,774 B2 | 3/2013 | Yavuz |
| 8,411,594 B2 | 4/2013 | Black |
| 8,412,227 B2 | 4/2013 | Edge |
| 8,416,756 B2 | 4/2013 | Bhushan |
| 8,451,740 B2 | 5/2013 | Sampath |
| 8,451,776 B2 | 5/2013 | Dayal |
| 8,452,011 B2 | 5/2013 | Guo |
| 8,457,152 B2 | 6/2013 | Gorokhov |
| 8,462,859 B2 | 6/2013 | Sampath |
| 8,472,322 B2 | 6/2013 | Black |
| 8,472,877 B2 | 6/2013 | Hou |
| 8,483,223 B2 | 7/2013 | Black |
| 8,494,593 B2 | 7/2013 | Black |
| 8,498,192 B2 | 7/2013 | Bhushan |
| 8,503,360 B2 | 8/2013 | Hou |
| 8,514,988 B2 | 8/2013 | Wu |
| 8,537,875 B2 | 9/2013 | Soriaga |
| 8,576,760 B2 | 11/2013 | Gorokhov |
| 8,582,621 B2 | 11/2013 | Grob |
| 8,583,137 B2 | 11/2013 | Rezaiifar |
| 8,594,252 B2 | 11/2013 | Black |
| 8,605,729 B2 | 12/2013 | Dayal |
| 8,605,801 B2 | 12/2013 | Rezaiifar |
| 8,611,303 B2 | 12/2013 | Rezaiifar |
| 8,611,305 B2 | 12/2013 | Black |
| 8,611,310 B2 | 12/2013 | Black |
| 8,611,325 B2 | 12/2013 | Black |
| 8,619,717 B2 | 12/2013 | Agrawal |
| 8,619,835 B2 | 12/2013 | Grob |
| 8,630,602 B2 | 1/2014 | Attar |
| 8,634,435 B2 | 1/2014 | Kadous |
| 8,634,438 B2 | 1/2014 | Nanda |
| 8,635,645 B2 | 1/2014 | Krishnamoorthi |
| 8,638,758 B2 | 1/2014 | Black |
| 8,639,190 B2 | 1/2014 | Gore |
| 8,654,705 B2 | 2/2014 | Wang |
| 8,654,715 B2 | 2/2014 | Wang |
| 8,655,400 B2 | 2/2014 | Kadous |
| 8,676,209 B2 | 3/2014 | Gorokhov |
| 8,700,083 B2 | 4/2014 | Yavuz |
| 8,712,461 B2 | 4/2014 | Yavuz |
| 8,724,545 B2 | 5/2014 | Dayal |
| 8,724,555 B2 | 5/2014 | Krishnan |
| 8,732,272 B2 | 5/2014 | Deshpande |
| 8,737,538 B2 | 5/2014 | Grob |
| 8,737,911 B2 | 5/2014 | Black |
| 8,743,909 B2 | 6/2014 | Black |
| 8,744,018 B2 | 6/2014 | Chen |
| 8,760,994 B2 | 6/2014 | Wang |
| 8,767,885 B2 | 7/2014 | Sampath |
| 8,773,308 B2 | 7/2014 | Black |
| 8,782,112 B2 | 7/2014 | Ling |
| 8,824,979 B2 | 9/2014 | Yavuz |
| 8,825,860 B2 | 9/2014 | Linsky |
| 8,830,934 B2 | 9/2014 | Banister |
| 8,831,156 B2 | 9/2014 | Liang |
| 8,839,079 B2 | 9/2014 | Chen |
| 8,842,693 B2 | 9/2014 | Agrawal |
| 8,848,607 B2 | 9/2014 | Wang |
| 8,854,944 B2 | 10/2014 | Jou |
| 8,855,001 B2 | 10/2014 | Gorokhov |
| 8,867,456 B2 | 10/2014 | Yavuz |
| 8,868,118 B2 | 10/2014 | Rezaiifar |
| 8,873,534 B2 | 10/2014 | Sindhushayana |
| 8,879,440 B2 | 11/2014 | Guo |
| 8,879,445 B2 | 11/2014 | Sadek |
| 8,885,744 B2 | 11/2014 | Kadous |
| 8,886,126 B2 | 11/2014 | Mantravadi |
| 8,886,239 B2 | 11/2014 | Dayal |
| 8,891,436 B2 | 11/2014 | Zhang |
| 8,897,181 B2 | 11/2014 | Wang |
| 8,897,188 B2 | 11/2014 | Black |
| 8,897,220 B2 | 11/2014 | Kadous |
| 8,897,256 B2 | 11/2014 | Cherian |
| 8,903,021 B2 | 12/2014 | Mantravadi |
| 8,908,496 B2 | 12/2014 | Kadous |
| 8,923,109 B2 | 12/2014 | Wang |
| 8,923,125 B2 | 12/2014 | Lott |
| 8,923,208 B2 | 12/2014 | Dayal |
| 8,929,908 B2 | 1/2015 | Agrawal |
| 8,948,095 B2 | 2/2015 | Black |
| 8,948,147 B2 | 2/2015 | Zheng |
| 8,954,063 B2 | 2/2015 | Sarkar |
| 8,971,461 B2 | 3/2015 | Sampath |
| 8,971,823 B2 | 3/2015 | Gore |
| 8,971,884 B2 | 3/2015 | Ahluwalia |
| 8,983,480 B2 | 3/2015 | Rezaiifar |
| 8,995,417 B2 | 3/2015 | Jou |
| 9,001,735 B2 | 4/2015 | Padovani |
| 9,007,942 B2 | 4/2015 | Zhao |
| 9,014,152 B2 | 4/2015 | Jou |
| 9,055,545 B2 | 6/2015 | Black |
| 9,059,785 B2 | 6/2015 | Fertonani |
| 9,066,306 B2 | 6/2015 | Yavuz |
| 9,071,344 B2 | 6/2015 | Smee |
| 9,072,102 B2 | 6/2015 | Yavuz |
| 9,078,269 B2 | 7/2015 | Yavuz |
| 9,088,389 B2 | 7/2015 | Gorokhov |
| 9,106,287 B2 | 8/2015 | Wang |
| 9,113,488 B2 | 8/2015 | Oguz |
| 9,118,387 B2 | 8/2015 | Padovani |
| 9,119,026 B2 | 8/2015 | Black |
| 9,119,217 B2 | 8/2015 | Black |
| 9,124,344 B2 | 9/2015 | Padovani |
| 9,131,420 B2 | 9/2015 | Rezaiifar |
| 9,136,974 B2 | 9/2015 | Gorokhov |
| 9,137,806 B2 | 9/2015 | Yavuz |
| 9,143,957 B2 | 9/2015 | Sadek |
| 9,144,036 B2 | 9/2015 | Gorokhov |
| 9,144,084 B2 | 9/2015 | Sadek |
| 9,148,256 B2 | 9/2015 | Sampath |
| 9,154,179 B2 | 10/2015 | Gudem |
| 9,154,211 B2 | 10/2015 | Sampath |
| 9,155,106 B2 | 10/2015 | Krishnan |
| 9,161,232 B2 | 10/2015 | Linsky |
| 9,161,233 B2 | 10/2015 | Wang |
| 9,172,402 B2 | 10/2015 | Gudem |
| 9,172,453 B2 | 10/2015 | Wang |
| 9,179,319 B2 | 11/2015 | Gore |
| 9,184,870 B2 | 11/2015 | Sampath |
| 9,185,718 B2 | 11/2015 | Kadous |
| 9,185,720 B2 | 11/2015 | Mantravadi |
| 9,198,053 B2 | 11/2015 | Edge |
| 9,204,437 B2 | 12/2015 | Smee |
| 9,226,173 B2 | 12/2015 | Sadek |
| 9,246,560 B2 | 1/2016 | Sampath |
| 9,253,658 B2 | 2/2016 | Sadek |
| 9,264,972 B2 | 2/2016 | Fan |

(56) References Cited

U.S. PATENT DOCUMENTS

| | | | |
|---|---|---|---|
| 9,277,564 B2 | 3/2016 | Wang |
| 9,282,462 B2 | 3/2016 | Dayal |
| 9,288,814 B2 | 3/2016 | Yavuz |
| 9,307,544 B2 | 4/2016 | Gore |
| 9,344,973 B2 | 5/2016 | Yavuz |
| 9,363,764 B2 | 6/2016 | Black |
| 9,374,791 B2 | 6/2016 | Yavuz |
| 9,398,602 B2 | 7/2016 | Kadous |
| 9,408,165 B2 | 8/2016 | Jou |
| 9,408,220 B2 | 8/2016 | Gore |
| 9,419,751 B2 | 8/2016 | Sindhushayana |
| 9,450,638 B2 | 9/2016 | Yan |
| 9,451,480 B2 | 9/2016 | Huang |
| 9,461,736 B2 | 10/2016 | Bhushan |
| 9,474,075 B2 | 10/2016 | Yavuz |
| 9,491,722 B2 | 11/2016 | Yavuz |
| 9,497,495 B2 | 11/2016 | Krishnamoorthi |
| 9,509,452 B2 | 11/2016 | Liang |
| 9,525,477 B1 | 12/2016 | Wu |
| 9,578,649 B2 | 2/2017 | Dayal |
| 9,585,150 B2 | 2/2017 | Marsh |
| 9,585,156 B2 | 2/2017 | Bhattad |
| 9,609,649 B2 | 3/2017 | Fan |
| 9,660,776 B2 | 5/2017 | Kadous |
| 9,673,837 B2 | 6/2017 | Xue |
| 9,730,227 B2 | 8/2017 | Marsh |
| 9,750,014 B2 | 8/2017 | Sadek |
| 9,788,361 B2 | 10/2017 | Valliappan |
| 9,832,785 B2 | 11/2017 | Kadous |
| 9,860,033 B2 | 1/2018 | Kadous |
| 9,867,194 B2 | 1/2018 | Kadous |
| 9,893,800 B2 | 2/2018 | Wu |
| 9,900,856 B2 | 2/2018 | Wu |
| 9,924,368 B2 | 3/2018 | Valliappan |
| 9,936,400 B2 | 4/2018 | Lee |
| 9,954,668 B2 | 4/2018 | Lee |
| 9,955,476 B2 | 4/2018 | Black |
| 9,991,986 B2 | 6/2018 | Sindhushayana |
| 10,044,438 B2 | 8/2018 | Kadous |
| 10,044,459 B2 | 8/2018 | Chendamarai Kannan |
| 10,075,313 B2 | 9/2018 | Black |
| 10,091,789 B2 | 10/2018 | Valliappan |
| 10,178,649 B2 | 1/2019 | Liu |
| 10,182,404 B2 | 1/2019 | Prakash |
| 10,201,014 B2 | 2/2019 | Kadous |
| 10,218,406 B2 | 2/2019 | Liu |
| 10,219,235 B2 | 2/2019 | Patel |
| 10,219,252 B2 | 2/2019 | Chendamarai Kannan |
| 10,219,300 B2 | 2/2019 | Gorokhov |
| 10,225,818 B2 | 3/2019 | Liu |
| 2004/0110525 A1 | 6/2004 | Black |
| 2004/0121730 A1 | 6/2004 | Kadous |
| 2004/0208183 A1 | 10/2004 | Balachandran et al. |
| 2006/0203794 A1 | 9/2006 | Sampath |
| 2006/0229089 A1 | 10/2006 | Tokgoz |
| 2007/0041457 A1 | 2/2007 | Kadous |
| 2007/0066232 A1 | 3/2007 | Black |
| 2007/0071147 A1 | 3/2007 | Sampath |
| 2007/0165738 A1 | 7/2007 | Barriac |
| 2008/0025241 A1 | 1/2008 | Bhushan |
| 2008/0032740 A1 | 2/2008 | Joshi |
| 2008/0112495 A1 | 5/2008 | Gore |
| 2009/0080499 A1 | 3/2009 | Yavuz |
| 2009/0163209 A1 | 6/2009 | Black |
| 2010/0003931 A1 | 1/2010 | Krishnan |
| 2010/0046497 A1 | 2/2010 | Jalali |
| 2010/0067422 A1 | 3/2010 | Kadous |
| 2010/0215022 A1 | 8/2010 | Black |
| 2011/0007680 A1 | 1/2011 | Kadous |
| 2011/0007688 A1 | 1/2011 | Veeravalli |
| 2011/0222423 A1 | 9/2011 | Spindola |
| 2011/0256834 A1 | 10/2011 | Dayal |
| 2011/0310858 A1 | 12/2011 | Tokgoz |
| 2012/0077532 A1 | 3/2012 | Kadous |
| 2012/0113906 A1 | 5/2012 | Kadous |
| 2012/0127870 A1 | 5/2012 | Zhao |
| 2012/0127923 A1 | 5/2012 | Zhao |
| 2012/0140798 A1 | 6/2012 | Kadous |
| 2012/0213303 A1 | 8/2012 | Kadous |
| 2013/0201959 A1 | 8/2013 | Guo |
| 2013/0229961 A1 | 9/2013 | Ma |
| 2013/0229990 A1 | 9/2013 | Fan |
| 2014/0029705 A1 | 1/2014 | Wu |
| 2014/0038645 A1 | 2/2014 | Wu |
| 2014/0056239 A1 | 2/2014 | Zhang |
| 2014/0071894 A1 | 3/2014 | Kairouz |
| 2014/0079155 A1 | 3/2014 | Wang |
| 2014/0112267 A1 | 4/2014 | Chen |
| 2014/0133319 A1 | 5/2014 | Chen |
| 2014/0219117 A1 | 8/2014 | Meshkati |
| 2014/0219243 A1 | 8/2014 | Meshkati |
| 2014/0247814 A1 | 9/2014 | Zhang |
| 2014/0269616 A1 | 9/2014 | Black |
| 2014/0273884 A1 | 9/2014 | Mantravadi |
| 2014/0285684 A1 | 9/2014 | Huang |
| 2014/0362744 A1 | 12/2014 | Yan |
| 2015/0063150 A1 | 3/2015 | Sadek |
| 2015/0063151 A1 | 3/2015 | Sadek |
| 2015/0063323 A1 | 3/2015 | Sadek |
| 2015/0065152 A1 | 3/2015 | Sadek |
| 2015/0085686 A1 | 3/2015 | Chande |
| 2015/0133184 A1 | 5/2015 | Sadek |
| 2015/0139015 A1 | 5/2015 | Kadous |
| 2015/0163823 A1 | 6/2015 | Sadek |
| 2015/0173050 A1* | 6/2015 | Kang .................. H04B 7/1555 455/452.2 |
| 2015/0223077 A1 | 8/2015 | Fan |
| 2015/0280803 A1 | 10/2015 | Chen |
| 2015/0282077 A1 | 10/2015 | Yavuz |
| 2015/0319702 A1 | 11/2015 | Patel |
| 2015/0326382 A1 | 11/2015 | Li |
| 2015/0350919 A1 | 12/2015 | Patel |
| 2016/0014619 A1 | 1/2016 | Kang |
| 2016/0088625 A1 | 3/2016 | Kadous |
| 2016/0095039 A1 | 3/2016 | Valliappan |
| 2016/0095040 A1 | 3/2016 | Valliappan |
| 2016/0128130 A1 | 5/2016 | Sadek |
| 2016/0353482 A1 | 12/2016 | Valliappan |
| 2017/0005741 A1 | 1/2017 | Wu |
| 2017/0019814 A1 | 1/2017 | Determan |
| 2017/0027017 A1 | 1/2017 | Black |
| 2017/0048047 A1 | 2/2017 | Kadous |
| 2017/0055260 A1 | 2/2017 | Valliappan |
| 2017/0055285 A1 | 2/2017 | Valliappan |
| 2017/0064657 A1 | 3/2017 | Chendamarai Kannan |
| 2017/0064729 A1 | 3/2017 | Sadek |
| 2017/0093545 A1 | 3/2017 | Kadous |
| 2017/0094680 A1 | 3/2017 | Patel |
| 2017/0135029 A1 | 5/2017 | Chendamarai Kannan |
| 2017/0142705 A1 | 5/2017 | Chendamarai Kannan |
| 2017/0142713 A1 | 5/2017 | Chendamarai Kannan |
| 2017/0202022 A1 | 7/2017 | Chendamarai Kannan |
| 2017/0214443 A1* | 7/2017 | Chen ...................... H04B 7/06 |
| 2017/0222771 A1 | 8/2017 | Chendamarai Kannan |
| 2017/0223737 A1 | 8/2017 | Patel |
| 2017/0251473 A1 | 8/2017 | Xue |
| 2017/0280382 A1 | 9/2017 | Radulescu |
| 2017/0311316 A1 | 10/2017 | Chendamarai Kannan |
| 2017/0311343 A1 | 10/2017 | Chendamarai Kannan |
| 2017/0311346 A1 | 10/2017 | Chendamarai Kannan |
| 2017/0318586 A1 | 11/2017 | Wang |
| 2017/0332288 A1 | 11/2017 | Sadek |
| 2017/0359263 A1 | 12/2017 | Barghi |
| 2017/0359815 A1 | 12/2017 | Chendamarai Kannan |
| 2018/0042018 A1 | 2/2018 | Bhushan |
| 2018/0054348 A1 | 2/2018 | Luo |
| 2018/0054382 A1 | 2/2018 | Luo |
| 2018/0054762 A1 | 2/2018 | Kadous |
| 2018/0054780 A1 | 2/2018 | Radulescu |
| 2018/0054783 A1 | 2/2018 | Luo |
| 2018/0054811 A1 | 2/2018 | Luo |
| 2018/0054812 A1 | 2/2018 | Luo |
| 2018/0054830 A1 | 2/2018 | Luo |
| 2018/0054832 A1 | 2/2018 | Luo |

(56) References Cited

U.S. PATENT DOCUMENTS

| | | |
|---|---|---|
| 2018/0063799 A1 | 3/2018 | Sadek |
| 2018/0070243 A1 | 3/2018 | Liu |
| 2018/0084430 A1 | 3/2018 | Patel |
| 2018/0098225 A1 | 4/2018 | Damnjanovic |
| 2018/0098335 A1 | 4/2018 | Sun |
| 2018/0103461 A1 | 4/2018 | Sun |
| 2018/0103472 A1 | 4/2018 | Zhang |
| 2018/0109957 A1 | 4/2018 | Fan |
| 2018/0110022 A1 | 4/2018 | Fan |
| 2018/0110063 A1 | 4/2018 | Fan |
| 2018/0115907 A1 | 4/2018 | Damnjanovic |
| 2018/0115933 A1 | 4/2018 | Radulescu |
| 2018/0115973 A1 | 4/2018 | Black |
| 2018/0123859 A1 | 5/2018 | Liu |
| 2018/0124770 A1 | 5/2018 | Yerramalli |
| 2018/0124776 A1 | 5/2018 | Yerramalli |
| 2018/0124777 A1 | 5/2018 | Yerramalli |
| 2018/0124789 A1 | 5/2018 | Yerramalli |
| 2018/0124820 A1 | 5/2018 | Sun |
| 2018/0132236 A1 | 5/2018 | Kadous |
| 2018/0139616 A1 | 5/2018 | Khoshnevisan |
| 2018/0139618 A1 | 5/2018 | Yerramalli |
| 2018/0139782 A1 | 5/2018 | Sadek |
| 2018/0146480 A1 | 5/2018 | Chendamarai Kannan |
| 2018/0160328 A1 | 6/2018 | Chendamarai Kannan |
| 2018/0160389 A1 | 6/2018 | Yerramalli |
| 2018/0167848 A1 | 6/2018 | Lei |
| 2018/0167968 A1 | 6/2018 | Liu |
| 2018/0175986 A1 | 6/2018 | Chendamarai Kannan |
| 2018/0176946 A1 | 6/2018 | Sun |
| 2018/0198518 A1 | 7/2018 | Wu |
| 2018/0213560 A1 | 7/2018 | Naghshvar |
| 2018/0220428 A1 | 8/2018 | Sun |
| 2018/0227011 A1 | 8/2018 | Yerramalli |
| 2018/0227771 A1 | 8/2018 | Malik |
| 2018/0227797 A1 | 8/2018 | Liu |
| 2018/0227936 A1 | 8/2018 | Yerramalli |
| 2018/0227944 A1 | 8/2018 | Yerramalli |
| 2018/0241494 A1 | 8/2018 | Chendamarai Kannan |
| 2018/0241526 A1 | 8/2018 | Chendamarai Kannan |
| 2018/0242163 A1 | 8/2018 | Patel |
| 2018/0242223 A1 | 8/2018 | Chendamarai Kannan |
| 2018/0242232 A1 | 8/2018 | Chendamarai Kannan |
| 2018/0242348 A1 | 8/2018 | Chendamarai Kannan |
| 2018/0249380 A1 | 8/2018 | Zhang |
| 2018/0249496 A1 | 8/2018 | Radulescu |
| 2018/0255561 A1 | 9/2018 | Barghi |
| 2018/0255584 A1 | 9/2018 | Sun |
| 2018/0269962 A1 | 9/2018 | Liu |
| 2018/0278363 A1 | 9/2018 | Bhushan |
| 2018/0279134 A1 | 9/2018 | Malik |
| 2018/0279156 A1 | 9/2018 | Malik |
| 2018/0279212 A1 | 9/2018 | Malik |
| 2018/0279292 A1 | 9/2018 | Luo |
| 2018/0287762 A1 | 10/2018 | Sun |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0288781 A1 | 10/2018 | Akkarakaran |
| 2018/0294911 A1 | 10/2018 | Sun |
| 2018/0295622 A1 | 10/2018 | Sadek |
| 2018/0302186 A1 | 10/2018 | Reddy |
| 2018/0302201 A1 | 10/2018 | Yoo |
| 2018/0302796 A1 | 10/2018 | Zhang |
| 2018/0309479 A1 | 10/2018 | Yerramalli |
| 2018/0310267 A1 | 10/2018 | Liu |
| 2018/0310341 A1 | 10/2018 | Yerramalli |
| 2018/0317093 A1 | 11/2018 | Li |
| 2018/0317259 A1 | 11/2018 | Islam |
| 2018/0324713 A1 | 11/2018 | Yoo |
| 2018/0331870 A1 | 11/2018 | Sun |
| 2018/0332551 A1 | 11/2018 | Liu |
| 2018/0343156 A1 | 11/2018 | Malik |
| 2018/0343588 A1 | 11/2018 | Sadek |
| 2018/0343676 A1 | 11/2018 | Yerramalli |
| 2018/0352563 A1 | 12/2018 | Liu |
| 2018/0359656 A1 | 12/2018 | Liu |
| 2018/0359685 A1 | 12/2018 | Li |
| 2018/0367362 A1 | 12/2018 | Sun |
| 2018/0368089 A1 | 12/2018 | Yerramalli |
| 2018/0376392 A1 | 12/2018 | Wu |
| 2018/0376393 A1 | 12/2018 | Wu |
| 2018/0376503 A1 | 12/2018 | Sun |
| 2019/0007946 A1 | 1/2019 | Yerramalli |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020527 A1 | 1/2019 | Lei |
| 2019/0020528 A1 | 1/2019 | Lei |
| 2019/0020529 A1 | 1/2019 | Lei |
| 2019/0021080 A1 | 1/2019 | Lei |
| 2019/0028999 A1 | 1/2019 | Yerramalli |
| 2019/0029019 A1 | 1/2019 | Zhang |
| 2019/0037376 A1 | 1/2019 | Liu |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037525 A1 | 1/2019 | Liu |
| 2019/0037603 A1 | 1/2019 | Damnjanovic |
| 2019/0053269 A1 | 2/2019 | Lei |
| 2019/0059001 A1 | 2/2019 | Yerramalli |
| 2019/0059102 A1 | 2/2019 | Yerramalli |
| 2019/0069325 A1 | 2/2019 | Yerramalli |
| 2019/0075597 A1 | 3/2019 | Yerramalli |

OTHER PUBLICATIONS

Wang, et al., Optimizing User Selection Schemes in Vector Broadcast Channels, IEEE Transactions on Communications, pp. 1-12, Dec. 2, 2014.

Yoo, et al., Optimality of Zero-Forcing Beamforming with Multiuser Diversity, IEEE International Conference on Communications, May 2005.

3GPP RP-170750, New WID: Further Enhancements to Coordinated Multi-Point (CoMP) Operation for LTE, Mar. 2017.

3GPP TR 36.741, Study on Further Enhancements to Coordinated Multi-Point (CoMP) Operation for LTE, V14.0.0, Mar. 2017.

Agrawal, et al., Dynamic Point Selection for Lte-Advanced: Algorithms and Performance, Wireless Communications and Networking Conference (WCNC), 2014 IEEE, Istanbul, Turkey, Apr. 2014, pp. 1392-1397.

Andrews, et al., Are We Approaching the Fundamental Limits of Wireless Network Densification?, IEEE Communications Magazine, vol. 54, No. 10, pp. 184-190, Oct. 2016.

Björnson, et al., Cooperative Multicell Precoding: Rate Region Characterization and Distributed Strategies with Instantaneous and Statistical CSI, IEEE Transactions on Signal Processing, vol. 58, No. 8, pp. 4298-4310, Aug. 2010.

Buzzi, et al., Cell-Free Massive MIMO: User-Centric Approach, IEEE Wireless Communications Letters, vol. 6, No. 6, pp. 706-709, Dec. 2017.

Checko, et al., Cloud RAN for Mobile Networks—A Technology Overview, IEEE Communications Surveys & Tutorials, vol. 17, No. 1, Sep. 2014.

Chen, et al., Channel Hardening and Favorable Propagation in Cell-Free Massive MIMO with Stochastic Geometry, version 1, 2017. Available at: http://arxiv.org/abs/1710.00395.

Chen, et al., Channel Hardening and Favorable Propagation in Cell-Free Massive MIMO with Stochastic Geometry, version 2, 2018. Available at: http://arxiv.org/abs/1710.00395.

Davydov, et al., Evaluation of Joint Transmission CoMP in C-RAN based LTE-A HetNets with Large Coordination Areas, Proc. GLOBECOM'14, Atlanta, U.S., Dec. 2013, pp. 801-806.

Forenza, et al., Achieving Large Multiplexing Gain in Distributed Antenna Systems via Cooperation with pCell Technology, 49th Asilomar Conference on Signals, Systems and Computers, Nov. 2015, IEEE, pp. 286-293.

(56) References Cited

OTHER PUBLICATIONS

Gesbert, et al., Multi-cell MIMO Cooperative Networks: A New Look at Interference, IEEE Journal on Selected Areas in Communications, vol. 28, No. 9, pp. 1380-1408, Dec. 2010.

Gilhousen, et al., On the Capacity of a Cellular CDMA system, IEEE Transactions on Vehicular Technology, vol. 40, No. 2, pp. 303-311, May 1991.

Interdonato, et al., How Much Do Downlink Pilots Improve Cell-Free Massive MIMO?, IEEE, 2016, 7 pages.

Larsson, et al., Massive MIMO for Next Generation Wireless Systems, Jan. 2014.

Marzetta, et al., Fundamentals of Massive MIMO, Cambridge University Press, Dec. 2016, Table of Contents.

Nayebi, et al., Precoding and Power Optimization in Cell-Free Massive MIMO Systems, IEEE Transactions on Wireless Communications, vol. 16, No. 7, pp. 4445-4459, Jul. 2017.

Ngo, et al., Cell-Free Massive MIMO Versus Small Cells, IEEE Transactions on Wireless Communications, vol. 16, No. 3, pp. 1834-1850, Mar. 2017.

Ngo, et al., On the Total Energy Efficiency of Cell-Free Massive MIMO, IEEE Transactions on Green Communications and Networking, vol. 2, No. 1, pp. 25-39, Mar. 2018.

Osseiran, et al., 5G Mobile and Wireless Communications Technology, Cambridge University Press, Oct. 2016, Ch. 9, Coordinated multi-point transmission in 5G.

Rohde & Schwarz, LTE Transmission Modes and Beamforming, White Paper, Jul. 2015.

Shamai, et al., Enhancing the Cellular Downlink Capacity via Co-processing at the Transmitting End, Proceedings of IEEE VTC-Spring, vol. 3, 2001, pp. 1745-1749.

Sun, et al., Performance Evaluation of CS/CB for Coordinated Multipoint Transmission in LTE-A Downlink, Proceedings of IEEE PIMRC'12, Sydney, Australia, Sep. 2012, pp. 1061-1065.

Tanghe, et al., The Industrial Indoor Channel: Large-Scale and Temporal Fading at 900,2400, and 5200 MHz, IEEE Transactions on Wireless Communications, vol. 7, No. 7, pp. 2740-2751, Jul. 2008.

Wu, et al., Cloud Radio Access Network (C-RAN): A Primer, IEEE Network, vol. 29, No. 1, pp. 35-41, Jan./Feb. 2015.

Wu, et al., Centralized and Distributed Schedulers for Non-Coherent Joint Transmission, Sep. 2018.

Zhou, et al., Distributed Wireless Communication System: A New Architecture for Future Public Wireless Access, IEEE Communications Magazine, vol. 41, No. 3, pp. 108-113, Mar. 2003.

\* cited by examiner

INITIAL SET OF ACTIVE UEs

SUBSET OF ACTIVE UEs SELECTED
TO BE SERVED

UPLINK USER EQUIPMENT SELECTION

BACKGROUND

Technical Field

Embodiments of this disclosure relate to wireless communication systems, such as cooperative multiple-input multiple output wireless communication systems.

Description of Related Technology

The types of modern computing devices continues to increase along with the differing and dynamic needs of each device. The wireless communication systems providing services to such devices are facing increasing constraints on resources and demands for quality and quantities of service. Accordingly, improvements in providing wireless communication services, such as in a multiple-input multiple-output system, are desired.

SUMMARY

One aspect of the disclosure provides a network system comprising a plurality of transmit antenna elements of one or more serving nodes. The network system further comprises a scheduler in communication with the plurality of transmit antenna elements, the scheduler comprising a processor and computer-executable instructions, where the computer-executable instructions, when executed by the processor, cause the scheduler to: determine downlink channel information for channels between a plurality of receive antenna elements associated with a plurality of user equipment (UEs) and the plurality of transmit antenna elements; determine, for each receive antenna element in the plurality, a channel strength based on the downlink channel information; order the plurality of receive antenna elements based on the determined channel strengths; and in order from highest-ordered receive antenna element to lowest-ordered receive antenna element, select the respective receive antenna element to be served by one or more of the plurality of transmit antenna elements during a first time slot in response to a determination that: a measurement that represents a spatial orthogonality between the respective receive antenna element and one or more spatial elements of one or more other receive antenna elements in the plurality selected to be served by one or more of the plurality of transmit antenna elements is greater than a threshold value, and a number of spatial dimensions provided by one or more receive antenna elements in the plurality selected to be served by one or more of the plurality of transmit antenna elements does not exceed a number of transmit antenna elements in the plurality of transmit antenna elements.

The network system of the preceding paragraph can include any sub-combination of the following features: where the computer-executable instructions, when executed, further cause the scheduler to determine the threshold value based on channel coefficients of a channel associated with the highest-ordered receive antenna element; where the computer-executable instructions, when executed, further cause the scheduler to determine the threshold value based on a constant value that is the same for all receive antenna elements in the plurality; where the computer-executable instructions, when executed, further cause the scheduler to periodically determine the threshold value based on a constant value that changes based on a block error rate performance associated with at least one receive antenna element in the plurality; where the computer-executable instructions, when executed, further cause the scheduler to determine the threshold value based on a constant value that is different for receive antenna elements in the plurality; where the constant value for a first receive antenna element in the plurality of receive antenna elements is based on interference between the first receive antenna element and one or more other receive antenna elements in the plurality; where the computer-executable instructions, when executed, further cause the scheduler to: acquire uplink channel information for the channels, and determine the downlink channel information using the acquired uplink channel information; where the computer-executable instructions, when executed, further cause the scheduler to order the plurality of receive antenna elements based on at least one of the determined channel strengths, latency priority, spectral efficiency, average throughput of the plurality of receive antenna elements over a threshold period of time, or normalized throughput of the plurality of receive antenna elements over the threshold period of time; where the computer-executable instructions, when executed, further cause the scheduler to determine a downlink channel precoder for the selected receive antenna elements; and where the computer-executable instructions, when executed, further cause the scheduler to select the respective receive antenna element to be served by one or more of the plurality of transmit antenna elements for one of a resource block, two or more resource blocks, or a frequency band of a carrier.

Another aspect of the disclosure provides a computer-implemented method comprising: determining downlink channel information for channels between a plurality of receive antenna elements associated with a plurality of user equipment (UEs) and a plurality of transmit antenna elements associated with a plurality of serving nodes; determining, for each receive antenna element in the plurality, a channel strength based on the downlink channel information; ordering the plurality of receive antenna elements based on the determined channel strengths; and in order from highest-ordered receive antenna element to lowest-ordered receive antenna element, selecting the respective receive antenna element to be served by one or more of the plurality of transmit antenna elements during a first time slot in response to a determination that a measurement that represents a spatial orthogonality between the respective receive antenna element and one or more spatial elements of one or more other receive antenna elements in the plurality selected to be served by one or more of the plurality of transmit antenna elements is greater than a threshold value.

The computer-implemented method of the preceding paragraph can include any sub-combination of the following features: where the computer-implemented method further comprises determining the threshold value based on channel coefficients of a channel associated with the highest-ordered receive antenna element; where determining the threshold value further comprises determining the threshold value based on a constant value that is the same for all receive antenna elements in the plurality; where determining the threshold value further comprises periodically determining the threshold value based on a constant value that changes based on a block error rate performance associated with at least one receive antenna element in the plurality; where determining the threshold value further comprises determining the threshold value based on a constant value that is different for receive antenna elements in the plurality; where the constant value for a first receive antenna element in the plurality of receive antenna elements is based on interference between the first receive antenna element and one or more other receive antenna elements in the plurality; where determining downlink channel information further comprises: acquiring uplink channel information for the channels, and determining the downlink channel information using the acquired uplink channel information; where ordering the plurality of receive antenna elements further comprises ordering the plurality of receive antenna elements based on at least one of the determined channel strengths, latency priority, spectral efficiency, average throughput of the plurality of receive antenna elements over a threshold period of time, or normalized throughput of the plurality of receive antenna elements over the threshold period of time; and where the computer-implemented method further comprises determining a downlink channel precoder for the selected receive antenna elements.

Another aspect of the disclosure provides non-transitory, computer-readable storage media comprising computer-executable instructions, where the computer-executable instructions, when executed by a scheduler in a baseband unit, cause the baseband unit to: determine downlink channel information for channels between a plurality of receive antenna elements associated with a plurality of user equipment (UEs) and a plurality of transmit antenna elements associated with a plurality of serving nodes; determine, for each receive antenna element in the plurality, a channel strength based on the downlink channel information; order the plurality of receive antenna elements based on the determined channel strengths; and in order from highest-ordered receive antenna element to lowest-ordered receive antenna element, select the respective receive antenna element to be served by one or more of the plurality of transmit antenna elements during a first time slot in response to a determination that a measurement that represents a spatial orthogonality between the respective receive antenna element and one or more spatial elements of one or more other receive antenna elements in the plurality selected to be served by one or more of the plurality of transmit antenna elements satisfies a threshold value.

Another aspect of the disclosure provides a network system comprising a plurality of receive antenna elements of one or more serving nodes. The network system further comprises a scheduler in communication with the plurality of receive antenna elements, the scheduler comprising a processor and computer-executable instructions, where the computer-executable instructions, when executed by the processor, cause the scheduler to: obtain uplink channel information for channels between the plurality of receive antenna elements and a plurality of transmit antenna elements associated with a plurality of user equipment (UEs); determine, for each transmit antenna element in the plurality, a channel strength based on the uplink channel information; order the plurality of transmit antenna elements based on the determined channel strengths; and in order from highest-ordered transmit antenna element to lowest-ordered transmit antenna element, select the respective transmit antenna element to communicate with one or more of the plurality of receive antenna elements during a first time slot in response to a determination that: a measurement that represents a spatial orthogonality between the respective transmit antenna element and one or more spatial elements of one or more other transmit antenna elements in the plurality selected to communicate with one or more of the plurality of receive antenna elements is greater than a threshold value, and a number of spatial dimensions provided by one or more transmit antenna elements in the plurality selected to communicate with one or more of the plurality of receive antenna elements does not exceed a number of receive antenna elements in the plurality of receive antenna elements.

The network system of the preceding paragraph can include any sub-combination of the following features: where the computer-executable instructions, when executed, further cause the scheduler to determine the threshold value based on channel coefficients of a channel associated with the highest-ordered transmit antenna element; where the computer-executable instructions, when executed, further cause the scheduler to determine the threshold value based on a constant value that is the same for all transmit antenna elements in the plurality; where the computer-executable instructions, when executed, further cause the scheduler to periodically determine the threshold value based on a constant value that changes based on a block error rate performance associated with at least one transmit antenna element in the plurality; where the computer-executable instructions, when executed, further cause the scheduler to determine the threshold value based on a constant value that is different for transmit antenna elements in the plurality; where the constant value for a first transmit antenna element in the plurality of transmit antenna elements is based on interference between the first transmit antenna element and one or more other transmit antenna elements in the plurality; where the computer-executable instructions, when executed, further cause the scheduler to obtain the uplink channel information for the channels from one or more of the plurality of transmit antenna elements; where the computer-executable instructions, when executed, further cause the scheduler to obtain the uplink channel information for the channels based on one or more uplink pilot signals; where the computer-executable instructions, when executed, further cause the scheduler to order the plurality of transmit antenna elements based on at least one of the determined channel strengths, latency priority, spectral efficiency, average throughput of the plurality of transmit antenna elements over a threshold period of time, or normalized throughput of the plurality of transmit antenna elements over the threshold period of time; and where the computer-executable instructions, when executed, further cause the scheduler to select the respective transmit antenna element to communicate with one or more of the plurality of receive antenna elements for one of a resource block, two or more resource blocks, or a frequency band of a carrier.

Another aspect of the disclosure provides a computer-implemented method comprising: obtaining uplink channel information for channels between the plurality of receive antenna elements and a plurality of transmit antenna elements associated with a plurality of user equipment (UEs); determining, for each transmit antenna element in the plurality, a channel strength based on the uplink channel information; ordering the plurality of transmit antenna elements based on the determined channel strengths; and in order from highest-ordered transmit antenna element to lowest-ordered transmit antenna element, selecting the respective transmit antenna element to communicate with one or more of the plurality of receive antenna elements during a first time slot in response to a determination that a measurement that represents a spatial orthogonality between the respective transmit antenna element and one or more spatial elements of one or more other transmit antenna elements in the plurality selected to communicate with one or more of the plurality of receive antenna elements is greater than a threshold value.

The computer-implemented method of the preceding paragraph can include any sub-combination of the following features: where the computer-implemented method further comprises determining the threshold value based on channel coefficients of a channel associated with the highest-ordered transmit antenna element; where determining the threshold value further comprises determining the threshold value based on a constant value that is the same for all transmit antenna elements in the plurality; where determining the threshold value further comprises periodically determining the threshold value based on a constant value that changes based on a block error rate performance associated with at least one transmit antenna element in the plurality; where determining the threshold value further comprises determining the threshold value based on a constant value that is different for transmit antenna elements in the plurality; where the constant value for a first transmit antenna element in the plurality of transmit antenna elements is based on interference between the first transmit antenna element and one or more other transmit antenna elements in the plurality; where obtaining uplink channel information further comprises obtaining the uplink channel information for the channels from one or more of the plurality of transmit antenna elements; where obtaining uplink channel information further comprises obtaining the uplink channel information for the channels based on one or more uplink pilot signals; and where ordering the plurality of transmit antenna elements ordering the plurality of transmit antenna elements based on at least one of the determined channel strengths, latency priority, spectral efficiency, average throughput of the plurality of transmit antenna elements over a threshold period of time, or normalized throughput of the plurality of transmit antenna elements over the threshold period of time.

Another aspect of the disclosure provides non-transitory, computer-readable storage media comprising computer-executable instructions, where the computer-executable instructions, when executed by a scheduler in a baseband unit, cause the baseband unit to: obtain uplink channel information for channels between the plurality of receive antenna elements and a plurality of transmit antenna elements associated with a plurality of user equipment (UEs); determine, for each transmit antenna element in the plurality, a channel strength based on the uplink channel information; order the plurality of transmit antenna elements based on the determined channel strengths; and in order from highest-ordered transmit antenna element to lowest-ordered transmit antenna element, select the respective transmit antenna element to communicate with one or more of the plurality of receive antenna elements during a first time slot in response to a determination that a measurement that represents a spatial orthogonality between the respective transmit antenna element and one or more spatial elements of one or more other transmit antenna elements in the plurality selected to communicate with one or more of the plurality of receive antenna elements satisfies a threshold value.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
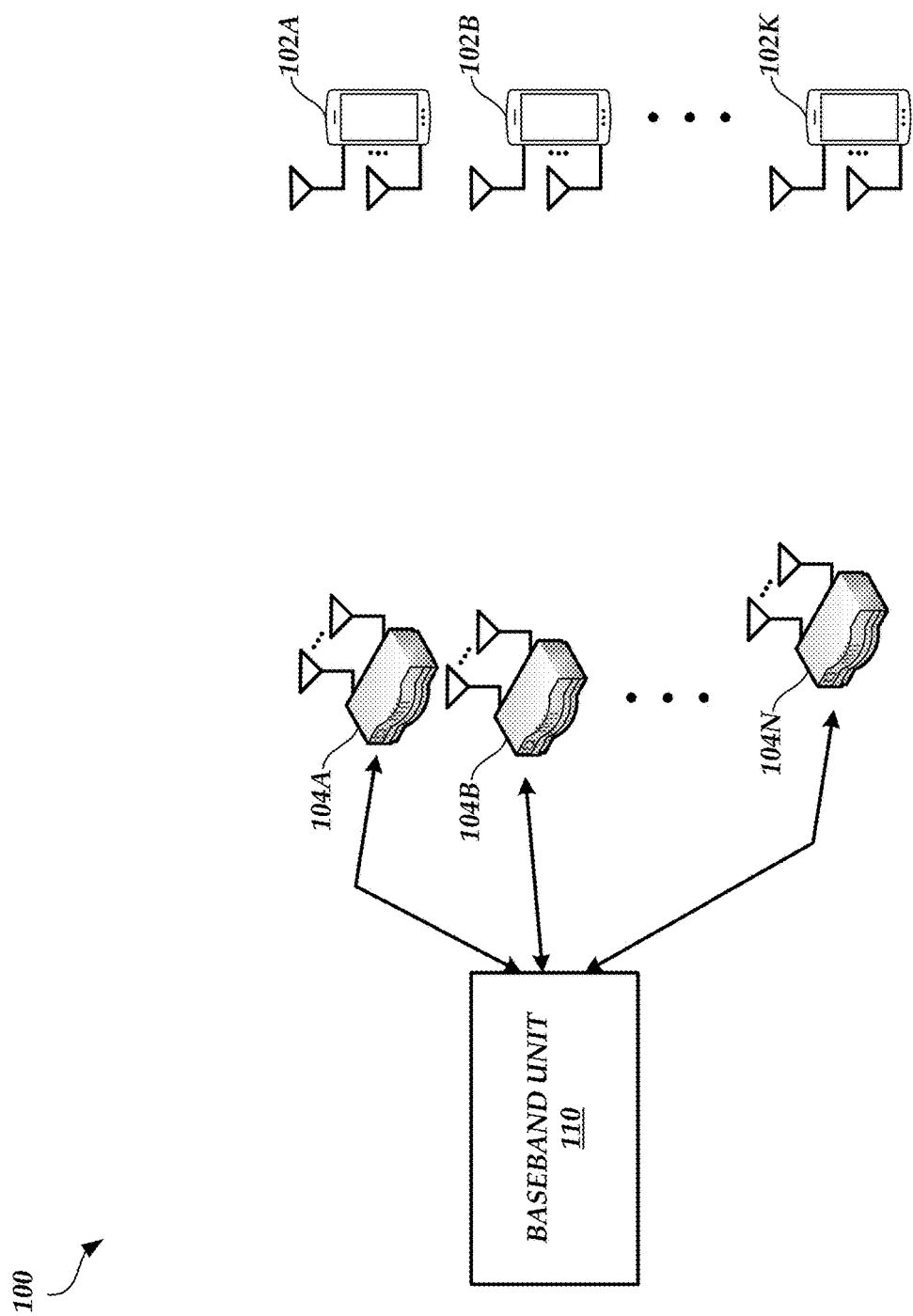
FIG. 1 is a diagram illustrating a cooperative MIMO network environment that includes a baseband unit (BBU), remote radio unit (RRUs), and UEs according to an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

As wireless networks are increasingly used to run services sensitive to reliability and/or latency issues (e.g., media streaming, video chat, virtual reality, etc.), multi-antenna techniques have served as a prominent solution for minimizing such issues. For example, one type of multi-antenna solution is a traditional multiple-input multiple-output (MIMO) network in which transmitters and receivers each have multiple antennas over which communications are sent. However, it has become difficult for certain wireless devices (e.g., user equipment (UE), base stations, etc.) to support multiple antennas and/or proper spacing between antennas as the devices have evolved. Cooperative MIMO networks, on the other hand, can achieve the benefits of traditional MIMO networks without being constrained by whether the wireless devices can support multiple antennas. For example, one or more wireless devices can be grouped together to create a virtual antenna array, and the grouped wireless devices together can act as a MIMO device.

One version of Cooperative MIMO is Coordinated Multipoint (CoMP) in which one or more base stations share data, channel state information, etc., coordinating downlink transmissions and jointly processing uplink transmissions.

Because base stations coordinate downlink transmissions, disruptions and/or interruptions caused by handing over a UE from one base station to another can be avoided. In addition, the base stations can work collectively to cover geographic areas that otherwise may not be covered by any single base station. Thus, a CoMP network may provide a seamless area of coverage for a UE.

Generally, base stations can serve a certain number of UEs simultaneously within the same time slot or over different time slots. However, the number of UEs that can be served simultaneously within the same time slot may be limited by the number of spatial dimensions or layers collectively served by the base stations. As described herein, the number of spatial dimensions collectively served by the base stations may be the number of spatial beams served by the base stations, the number of transmission layers served by the base stations (during downlink scenarios), or the number of receive layers provided by the base stations (during uplink scenarios). For example, the number of spatial dimensions collectively served by the base stations may be based on the total number of transmit antennas provided by the base stations. Assuming that the total number of transmit antennas is N, the number of UEs that can be served simultaneously within the same time slot is some number K less than or equal to N.

Occasionally, the number of UEs that are active or otherwise capable of receiving downlink messages or transmitting uplink messages exceeds the number of spatial dimensions collectively served by the base stations. Thus, the base stations can serve just a subset of all of the active UEs during the same time slot. In fact, as described below, it may be beneficial for the base stations to serve just a subset of all of the active UEs during the same time slot even if there are a sufficient number of spatial dimensions to serve all of the active UEs.

Selecting which active UEs to serve and which active UEs not to serve during the same time slot can be difficult, however. For example, serving a particular combination of active UEs using a particular combination of spatial dimensions during the same time slot may result in some UEs suffering from a high level of interference. In particular, some UEs may suffer from a high level of interference if the spatial dimensions over which communicates are sent to or received by the UEs are correlated (e.g., the spatial dimensions are not orthogonal to each other by at least a threshold angle, the spatial dimensions are oblique or parallel with each other at least within a threshold angle, etc.). It, therefore, may be beneficial to select a combination of active UEs to serve during the same time slot and a combination of spatial dimensions over which the active UEs are served that maximizes or improves downlink capacity and/or throughput within the per base station transmit antenna maximum power constraint and/or that maximizes or improves uplink capacity and/or throughput within the per UE transmit antenna maximum power constraint (e.g., a combination that reduces potential active UE interference). Depending on the number of base stations and active UEs in the MIMO network, there may be hundreds to thousands of possible combinations of active UE and spatial dimension groupings. As an illustrative example, a number of spatial dimensions served by the base stations may be 64 or 128, which can result in thousands of different possible combinations of active UE and spatial dimension groupings even if the number of active UEs in the MIMO network is relatively small (e.g., 4, 8, 12, etc.).

Whether a particular combination of active UE and spatial dimension groupings maximizes or improves capacity and/ or throughput may depend on a precoder and/or sum capacity computed for the particular combination. Given the number of possible combinations, however, computing a precoder and/or sum capacity for some or all of the possible combinations can be resource intensive and involve extremely high complexity, and therefore be impractical.

To reduce the complexity and the amount of resources (e.g., hardware resources of a baseband unit or other central processing system) allocated to identify a particular combination of active UE and spatial dimension groupings, a baseband unit or a central processing system in the MIMO network can be configured to separate the selection of a particular combination of active UE and spatial dimension groupings from computations of the precoder and/or the sum capacity. Rather, the baseband unit or the central processing system can treat different spatial dimensions as virtual UEs. In this way, the baseband unit or the central processing system can schedule a single UE with multiple spatial dimensions.

For example, the baseband unit or the central processing system can select a particular combination of active UE and spatial dimension groupings for a particular frequency wholeband (e.g., a group of resource blocks (RBs) that each correspond to a particular frequency range and a single time slot, where the group of RBs collectively correspond to the whole frequency band of a carrier) or a frequency sub-band (e.g., a single RB or a group of consecutive RBs (e.g., RBG) that correspond with a portion of, but not all of, the whole frequency band of a carrier). The baseband unit or the central processing system can identify separate groupings for uplink and downlink communications or can identify the same groupings for uplink and downlink communications.

For downlink communications (e.g., transmission from base stations to UEs) and a particular frequency wholeband or sub-band, the baseband unit or the central processing system can determine uplink channel information (e.g., uplink spatial or channel coefficients) for channels between base stations and UEs. In particular, the baseband unit or the central processing system can determine uplink channel information for channels between each base station receive antenna element and each UE transmit antenna element. The baseband unit or the central processing system can then estimate downlink channel information (e.g., downlink spatial or channel coefficients) using the uplink channel information. Thus, the estimated downlink channel information may correspond to channels between each base station transmit antenna element and each UE receive antenna element. In particular, the downlink channel information can be estimated from the determined uplink channel information because an assumption may be made that uplink and downlink communications are multiplexed in a time division duplexing manner (e.g., uplink and downlink communications are scheduled during different time slots) and that the uplink and downlink channels maintain reciprocity over a short period of time (e.g., 1 ms, 5, ms, 10 ms, etc.). Thus, for each UE, the baseband unit or the central processing system can determine a matrix of estimated downlink channel information, where each element in the matrix corresponds to a particular base station transmit antenna element and a receive antenna element of the respective UE. The estimated downlink channel information is optionally subject to a scaling correct as a result of calibration between downlink and uplink radio frequency (RF) chains.

The baseband unit or the central processing system can, for each UE, determine a matrix norm (e.g., the L2-norm) of the matrix of estimated downlink channel information corresponding to the respective UE. The matrix norm may represent a strength of a channel between the base stations and the respective UE, where a larger matrix norm may represent a stronger channel.

The baseband unit or the central processing system can then order the UEs. For example, the baseband unit or the central processing system can factor channel strength, latency, and/or a fairness metric in determining how to order the UEs. As one example, the baseband unit or the central processing system can determine an average throughput of each UE over a period of time. Thus, if a UE has not been served for a long period of time, the average throughput determined for the UE may be a small value. Some UEs can transmit over multiple spatial dimensions simultaneously, and therefore the determined average throughput may be per spatial dimension. The baseband unit or the central processing system can compute a fairness metric for each UE by dividing the matrix norm of the respective UE by the average throughput of the respective UE. The baseband unit or the central processing system can then order the UEs based on the fairness metric. For example, the baseband unit or the central processing system can order the UEs such that the UE having the highest fairness metric is ordered first, the UE having the second highest fairness metric is ordered second, the UE having the third highest fairness metric is ordered third, and so on.

Alternatively, in situations in which UEs can support multiple spatial dimensions simultaneously, the baseband unit or the central processing system can determine a normalized throughput for each UE to order the UEs. For example, the baseband unit or the central processing system can determine an average throughput of each UE over a period of time. The baseband unit or the central processing system can then, for each UE, determine a number of potential spatial dimensions that will be used by the respective UE, and divide the average throughput of the respective UE by the number of potential spatial dimensions that will be used by the respective UE to form the normalized throughput for the respective UE. The baseband unit or the central processing system can then determine the fairness metrics using the normalized throughputs rather than the average throughputs, and order the UEs using the fairness metrics as described above.

Once the UEs are ordered, the baseband unit or the central processing system can determine a threshold based on the largest matrix norm. For example, the threshold can be the product of a constant and the largest matrix norm. The constant can be the same value for all UEs. Alternatively, the constant can initially be one value and then adaptively change based on block error rate (BLER) performance associated with one or more of the UE receive antenna elements. In another alternative, the constant can be a value specific to a particular UE that optionally increases if the particular UE experiences interference from other simultaneously scheduled UEs (e.g., where the amount of the increase can be larger the more interference that is experienced).

Using the determined threshold and the UE order, the baseband unit or the central processing system can begin the UE and spatial dimension selection process. For example, the baseband unit or the central processing system can select the UE ordered first to be served during the time slot being scheduled. The baseband unit or the central processing system can then compute QR decomposition(s) to determine which additional UEs should be selected to be served during the time slot being scheduled. For example, computation of the QR decompositions may allow the baseband unit or the central processing system to determine whether the corresponding UEs would be associated with a spatial dimension that is roughly orthogonal (e.g., orthogonal by at least a threshold angle) to the spatial dimensions of other UEs already selected by the baseband unit or the central processing system to be served during the time slot. As an illustrative example, each QR decomposition computation for a UE may result in the generation of a measurement (e.g., value r described below) that represents the spatial orthogonality between one or more receive antennas of the UE and spatial elements (e.g., spatial channels, spatial beams, spatial dimensions, etc.) of one or more receive antennas of other UE(s), such as other UE(s) already selected to be served during the time slot being scheduled, that can be compared to the determined threshold. If the measurement satisfies the threshold (e.g., the measurement is greater than the threshold), then the baseband unit or the central processing system determines that the corresponding UE would be associated with a spatial dimension that is roughly orthogonal to the spatial dimensions of other UEs already selected by the baseband unit or the central processing system to be served during the time slot. Otherwise, if the measurement does not satisfy the threshold (e.g., the measurement is less than or equal to the determined threshold), then then the baseband unit or the central processing system determines that the corresponding UE would be associated with a spatial dimension that is not roughly orthogonal to the spatial dimensions of other UEs already selected by the baseband unit or the central processing system to be served during the time slot. Thus, the baseband unit or the central processing system can iterate through each of the remaining UEs and, using the QR decomposition of the respective UE, determine if the spatial dimension of the respective UE is roughly orthogonal to the spatial dimensions of other UEs already selected to be served during the time slot. If the spatial dimension of the respective UE is roughly orthogonal to the spatial dimensions of other UEs already selected to be served during the time slot, then the baseband unit or the central processing system can select the respective UE to also be served during the time slot being scheduled. Otherwise, if the spatial dimension of the respective UE is not roughly orthogonal (e.g., orthogonal by less than a threshold angle) to the spatial dimensions of other UEs already selected to be served during the time slot, then the baseband unit or the central processing system can decline to select the respective UE to be served during the time slot being scheduled and move on to the next UE in the order to determine whether the next UE should be selected to be served during the time slot being scheduled. The baseband unit or the central processing system can repeat these operations until the maximum number of UEs that can be served during the same time slot are selected or until all UEs have been evaluated for possible selection.

After determining which UEs to serve during the same time slot, the baseband unit or the central processing system can compute the downlink precoder (e.g., the downlink regularized zero forcing (RZF) precoder). The baseband unit or the central processing system can use an identification of the selected UEs, estimated downlink channel information for the selected UEs, and/or QR decompositions of the selected UEs to determine the downlink precoder.

For uplink communications (e.g., transmissions from UEs to base stations) and a particular frequency wholeband or sub-band, the baseband unit or the central processing system can perform the same operations described above to select a particular active UE and spatial dimension grouping to serve during the same time slot. However, the baseband unit or the central processing system may not need to determine any downlink channel information, and the uplink channel information can be substituted for the downlink channel information in any computations performed by the baseband unit or the central processing system. Thus, for each UE, the baseband unit or the central processing system can determine a matrix of uplink channel information, where each element in the matrix corresponds to a particular base station receive antenna element and a transmit antenna element of the respective UE. Furthermore, the baseband unit or the central processing system may not compute a precoder when selecting a particular active UE and spatial dimension grouping to serve during the same time slot for uplink communications. However, the baseband unit or the central processing system may compute receiver beamforming weights so that a serving node can receive data from multiple UEs simultaneously.

After the active UE and spatial dimension grouping is selected for a time slot, the base station(s) that serve a particular UE during the time slot can each transmit the same downlink data to the UE during the time slot using one or more spatial beams. The UE can then combine the received data (e.g., by selecting the best spatial beam, by performing a soft combine, by performing a non-coherent combine, by performing a coherent combine, etc.) and perform any corresponding operations.

As described herein, the baseband unit or the central processing system can compute and use vector norms in place of the matrix norms to select a particular combination of active UE and spatial dimension groupings. For example, the baseband unit or the central processing system can compute vector norms instead of matrix norms if each UE has a single receive (or transmit) antenna element. As another example, the baseband unit or the central processing system can compute vector norms instead of matrix norms if the baseband unit or the central processing system treats each UE receive (or transmit) antenna element as a different "user." In particular, the baseband or central processing system may treat each UE as a different "user" when computing matrix norms. By treating each UE receive (or transmit) antenna element as a different "user," the baseband unit or the central processing system can select a particular combination of active UE receive (or transmit) antenna element and spatial dimension groupings to be served during the same time slot rather than a particular combination of active UE and spatial dimension groupings. Thus, the baseband unit or the central processing system may ultimately select some receive (or transmit) antenna elements of an active UE, but not all of the active UE's receive (or transmit) antenna elements, to be served during the same time slot.

In some embodiments, the baseband unit or the central processing system selects an active UE and spatial dimension grouping for downlink transmissions during a particular time slot and uses this selection for uplink transmissions during another time slot (e.g., a time slot contiguous and after the downlink transmission time slot) as well. Thus, the baseband unit or the central processing system can perform the active UE and spatial dimension selection once for both downlink and uplink transmissions. In other embodiments, the baseband unit or the central processing system performs the active UE and spatial dimension selection twice for each set of downlink and uplink time slots—once for downlink transmissions and once for uplink transmissions. In this embodiment, the selection of active UE and spatial dimension groupings for downlink transmissions can be the same or different as the selection of active UE and spatial dimension groupings for uplink transmissions.

The baseband unit or the central processing system can select an active UE and spatial dimension grouping for a single time slot or a group of time slots. For example, the baseband unit or the central processing system can perform the active UE and spatial dimension grouping selection prior to a particular time slot, and repeat the operations prior to each successive time slot. Alternatively, the baseband unit or the central processing system can perform the active UE and spatial dimension grouping selection once prior to a time slot, and the selection can be used for one or more future time slots.

While the present disclosure is described herein such that the baseband unit or the central processing system performs the active UE and spatial dimension grouping selection and other related operations, this is not meant to be limiting. In other embodiments, the base stations may share data and collectively perform the active UE and spatial dimension grouping selection and/or other related operations described herein as being performed by the baseband unit or the central processing system independent of or jointly with the baseband unit or the central processing system. In such embodiments, the baseband unit or the central processing system is optionally present (e.g., the baseband unit or the central processing system may not be present if the base stations perform the operations independent of the baseband unit or the central processing system).

The active UE and spatial dimension grouping selection is described herein as being implemented within a CoMP network in which UEs non-coherently combine downlink data. The techniques described herein, however, can be applied to any type of MIMO network. Furthermore, the techniques described herein are not limited to MIMO networks in which UEs non-coherently combine downlink data. The UEs may combine downlink data in any suitable manner.

In an embodiment, the CoMP network is designed to operate at higher frequencies, such as at mmW frequencies. The techniques described herein can be applied to networks operating at any suitable range of frequencies. In addition, the techniques described herein can be used for a variety of use cases, such as media streaming, video chat, virtual reality, etc.

Active UE Selection in a MIMO Network

FIG. 1 is a diagram illustrating a cooperative MIMO network environment 100 that includes a baseband unit (BBU) 110, remote radio unit (RRUs) 104A-104N, and UEs 102A-102K according to an embodiment. For example, the network environment 100 can be a cooperative, or cloud radio access network (C-RAN) environment 100. The cooperative MIMO network can optionally function as a CoMP network in which UEs 102A-102K non-coherently combine downlink data. The RRUs 104A-104N may communicate with each other via a wired and/or wireless connection. The RRUs 104A-104N, directly or via a central processing system (e.g., the BBU 110), may further communicate with a core network (not shown) operated by a network service provider. The RRUs 104A-104N may be configured to transmit data to and/or receive data from some or all of the UEs 102A-102K at mmW frequencies.

In the network environment 100, base station functionality is subdivided between the BBU 110 and multiple RRUs (e.g., RRU 104A-104N). An RRU may include multiple antennas, and one or more of the antennas may serve as a transmit-receive point (TRP). The RRU and/or a TRP may be referred to as a serving node or a base station. The BBU 110 may be physically connected to the RRUs 104A-104N, such as via an optical fiber connection. The BBU 110 may provide operational details to an RRU 104A-104N to control transmission and reception of signals from the RRU 104A-104N along with control data and payload data to transmit. The RRU 104A-104N may provide data to the network received from UEs 102A-102K within a service area associated with the RRU 104A-104N. An RRU 104A-104N can provide service to devices (e.g., UEs 102A-102K) with a service area. For example, wireless downlink transmission service may be provided by an RRU 104A-104N to the service area to communicate data to one or more devices within the service area.

The RRUs 104A-104N may each have one or more transmit antennas that each support one or more digital basebands. In some embodiments, each RRU 104A-104N has the same number of transmit antennas. In other embodiments, some or all RRUs 104A-104N have a different number of transmit antennas than other RRUs 104A-104N. Thus, the RRUs 104A-104N may collectively be capable of transmitting N spatial beams, where N is the product of the number of RRUs 104A-104N in the network environment 100 and the number of transmit antennas operated by a single RRU 104A-104N. Similarly, each RRU 104A-104N can have the same number or different number of receive antennas. The BBU 110 and/or the RRUs 104A-104N can be collectively referred to herein as a "network system."

Various standards and protocols may be included in the network environment 100 to wirelessly communicate data between a base station (e.g., an RRU 104) and a wireless communication device (e.g., a UE 102). Some wireless devices may communicate using an orthogonal frequency-division multiplexing (OFDM) digital modulation scheme via a physical layer. OFDM standards and protocols can include the third generation partnership project (3GPP) long term evolution (LTE), the Institute of Electrical and Electronics Engineers (IEEE) 802.16 standard (e.g., 802.16e, 802.16m), which may be known as WiMAX (Worldwide interoperability for Microwave Access), and the IEEE 802.11 standard, which may be known as Wi-Fi. In some systems, a radio access network (RAN) may include one or more base stations associated with one or more evolved NodeBs (also commonly denoted as enhanced NodeBs, eNodeBs, or eNBs), next generation NodeBs (gNBs), or any other suitable NodeBs (xNBs). In other embodiments, radio network controllers (RNCs) may be provided as the base stations. A base station provides a bridge between the wireless network and a core network such as the Internet. The base station may be included to facilitate exchange of data for the wireless communication devices of the wireless network.

The wireless communication device may be referred to as a user equipment (UE). The UE may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the UE may include a sensor or other networked device configured to collect data and wirelessly provide the data to a device (e.g., server) connected to a core network such as the Internet. Such devices may be referred to as Internet of Things devices (IoT devices). A downlink (DL) transmission generally refers to a communication from a base station to the wireless communication device, and an uplink (UL) transmission generally refers to a communication from the wireless communication device to the base station.

An active UE may be a UE for which a base station has data ready to transmit to the UE or has been informed (e.g., by another UE, by another base station, by the BBU 110, by the core network, etc.) that data will be arriving with the UE as the intended destination. Similarly, an active UE may also be a UE that has data ready to transmit to a base station.

As described herein, an RRU 104 may include one or more antennas, and one or more of the antennas may serve as a TRP. An RRU 104 may include multiple antennas to provide multiple-input multiple-output (MIMO) communications. For example, an RRU 104 may be equipped with various numbers of transmit antennas (e.g., 1, 2, 4, 8, or more) that can be used simultaneously for transmission to one or more receivers, such as a UE 102. Receiving devices (e.g., UEs 102) may include more than one receive antenna (e.g., 2, 4, etc.). The array of receive antennas may be configured to simultaneously receive transmissions from the RRU 104. Each antenna included in a RRU 104 may be individually configured to transmit and/or receive according to a specific time, frequency, power, and direction configuration. Similarly, each antenna included in a UE 102 may be individually configured to transmit or receive according to a specific time, frequency, power, and direction configuration. The configuration may be provided by the RRU 104 and/or the BBU 110. The direction configuration may be generated based on network estimate using channel reciprocity or determined based on feedback from UE 102 via selection of a beamforming codebook index, or a hybrid of the two.

Each RRU 104A-104N may support one or more digital basebands, the number of which may be less than or equal to the number of transmit antennas that the respective RRU 104A-104N has. Thus, assuming each RRU 104A-104N has $N_t$ transmit antennas supported by $N_d$ digital basebands, the maximum number of spatial beams that can be supported by the RRUs 104A-104N is $N_t$*the number of RRUs 104, and the maximum number of independent streams that can be supported by the RRUs 104A-104N is $N_d$*the number of RRUs 104. For simplicity and ease of explanation, the RRUs 104A-104N are assumed to each have 4 transmit antennas and 4 receive antennas. Thus, the maximum number of spatial beams that can be supported by the RRUs 104A-104N is 4*the number of RRUs 104. The RRUs 104A-104N can include the same number of receive antennas (e.g., used for UL transmissions) and transmit antennas (e.g., used for DL transmissions) or a different number of receive antennas and transmit antennas. In some embodiments, one or more antennas of a RRU 104A-104N can both transmit DL signals and receive UL signals. The techniques described herein apply whether the RRUs 104A-104N have the same or different number of antennas.

Similarly, the UEs 102A-102K can each include the same number of receive antennas (e.g., used for DL transmissions) and transmit antennas (e.g., used for UL transmissions) or a different number of receive antennas and transmit antennas. In some embodiments, one or more antennas of a UE 102 can both transmit UL signals and receive DL signals. Furthermore, the UEs 102A-102K and RRUs 104A-104N can each include the same number of antennas for DL and/or UL transmissions. Alternatively, one or more of the UEs 102A-102K and/or one or more of the RRUs 104A-104N can include a different number of antennas for DL and/or UL transmissions than other UEs 102A-102K and/or RRUs 104A-104N (e.g., RRU 104A can include 3 transmit antennas and 3 receive antennas, UE 102A can include 4 receive antennas and 4 transmit antennas, RRU 104B can include 4 transmit antennas and 2 receive antennas, UE 102B can include 2 receive antennas and 3 transmit antennas, etc.). For simplicity and ease of explanation, the UEs 102A-102N are assumed to each have 4 receive antennas and 4 transmit antennas. The techniques described herein apply whether the UEs 102A-102K have the same or different number of antennas.

The BBU 110 can include a scheduler (e.g., a scheduler control, such as scheduler control 214 of FIG. 2) that performs operations to select a grouping of active UEs and spatial dimensions to serve during the same time slot. The scheduler can perform the operations described herein for scheduling DL transmissions, UL transmissions, or both DL and UL transmissions. In particular, the scheduler can perform QR decompositions to select active UEs to serve during the same time slot over a particular set of spatial dimensions. The operations of the scheduler (e.g., the scheduler control 214) are described below with respect to FIG. 2.

Figure 2:
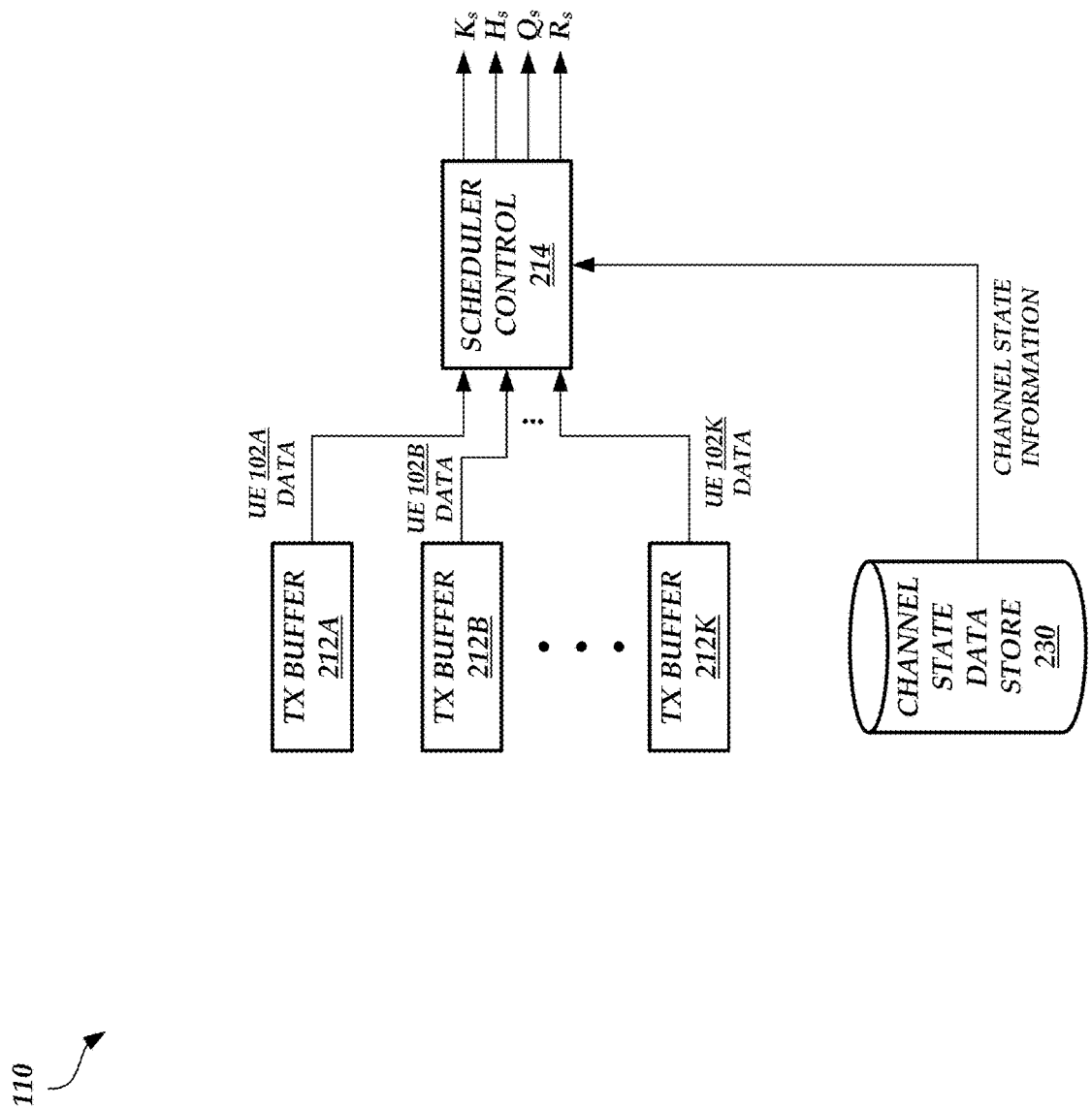
FIG. 2 is a diagram illustrating components of the BBU of FIG. 1 for selecting active UEs to serve during the same time slot over a particular set of spatial dimensions according to an embodiment.

FIG. 2 is a diagram illustrating components of the BBU 110 for selecting active UEs to serve during the same time slot over a particular set of spatial dimensions according to an embodiment. As illustrated in FIG. 2, the BBU 110 includes various transmit (TX) buffers 212A-212K, the scheduler control 214, and a channel state data store 230. A TX buffer 212A-212K may store DL data for a UE 102A-102K. For example, the BBU 110 may include one or more TX buffers 212A-212K for each active UE 102A-102K present in the network environment 100. For ease of explanation, FIG. 2 is illustrated such that the TX buffer 212A stores DL data for UE 102A, TX buffer 212B stores DL data for UE 102B, TX buffer 212K stores DL data for UE 102K, and so on.

The channel state data store 230 can store channel state information (e.g., UL and/or DL channel state information) for a variety of channels between the RRUs 104A-104N and the UEs 102A-102K. The channel state information may be associated with a specific RRU 104 and UE 102 combination, or the channel state information may be associated with a specific transmit (or receive) antenna of an RRU 104 and a specific receive (or transmit) antenna of a UE 102. The channel state information can include UL channel information acquired by the BBU 110 through UL channel estimations based on UL pilot signals. For example, UEs 102A-102K can transmit sounding reference signal (SRS) and/or physical uplink shared channel (PUSCH) demodulation reference signal (DMRS) pilot signals to one or more RRUs 104A-104N, and the BBU 110 (and/or one or more of the RRUs 104A-104N) can determine the UL channel information based on the transmitted pilot signals.

The TX buffers 212A-212K can provide UE 102A-102K DL data to the scheduler control 214, and the scheduler control 214 can obtain channel state information from the channel state data store 230. The scheduler control 214 can determine which UEs 102A-102K are active based on which UEs 102A-102K are associated with a TX buffer 212A-212K that is storing DL data for transmission to an associated UE 102A-102K. For simplicity, FIG. 2 is illustrated as showing that each of TX buffers 212A-212K is storing DL data for the associated UEs 102A-102K. Thus, each of UEs 102A-102K is considered to be an active UE.

The scheduler control 214 can select some or all of the active UEs 102A-102K to receive DL and/or UL transmissions over one or more spatial dimensions during the same time slot. The number of active UEs 102A-102K selected by the scheduler control 214 may not exceed the total number of spatial dimensions collectively provided by the RRUs 104A-104N present in the network environment 100. In an embodiment, the total number of spatial dimensions collectively provided by the RRUs 104A-104N can be the total number of transmit antennas (or receive antennas) provided by the RRUs 104A-104N. The scheduler control 214 can select a particular combination of active UE 102A-102K and spatial dimension groupings for a particular frequency wholeband (e.g., a group of RBs that each correspond to a particular frequency range and a single time slot, where the group of RBs collectively correspond to the whole frequency band of a carrier) or a frequency sub-band (e.g., a single RB or RBGs that correspond with a portion of, but not all of, the whole frequency band of a carrier). The scheduler control 214 can identify separate groupings for UL and DL communications or can identify the same groupings for UL and DL communications.

For DL communications and a particular frequency wholeband or sub-band, the scheduler control 214 can obtain, from the channel state data store 230, channel state information or channel information (e.g., UL spatial or channel coefficients) for channels between the RRUs 104A-104N and the UEs 102A-102K. In particular, the scheduler control 214 can obtain UL channel state information for channels between each RRU 104A-104N receive antenna and each UE 102A-102K transmit antenna. The scheduler control 214 can then estimate DL channel state information or channel information (e.g., DL spatial or channel coefficients) using the UL channel information. For example, the scheduler 214 can set the DL spatial or channel coefficients for a DL channel between a RRU 104A-104N and a UE 102A-102K to be the same as the UL spatial or channel coefficients for an UL channel between the same RRU 104A-104N and the same UE 102A-102K. The estimated DL channel state information is optionally subject to a scaling correct (E.g., by the scheduler control 214) as a result of calibration between DL and UL RF chains. Thus, the estimated DL channel state information may correspond to channels between each RRU 104A-104N transmit antenna and each UE 102A-102K receive antenna. In an embodiment, the DL channel state information can be estimated from the obtained UL channel state information because an assumption may be made that UL and DL communications are multiplexed in a time division duplexing manner (e.g., UL and DL communications are scheduled during different time slots) and that the UL and DL channels maintain reciprocity over a short period of time (e.g., a 10 ms, 100 ms, 1 s, 10 s, etc.). Thus, for each active UE 102A-102K, the scheduler control 214 can determine a matrix of estimated DL channel state information, where each element in the matrix corresponds to a particular RRU 104A-104N transmit antenna and a receive antenna of the respective UE 102A-102K.

As an illustrated example, $H_i$ can be an $N_T \times N_{r,i}$ matrix of estimated DL channel state information for UE i, where $N_T$ is the total number of spatial dimensions (e.g., the total number of transmit antennas, the total number of spatial beams, etc.) collectively provided by the RRUs 104A-104N and $N_{r,i}$ is the total number of receive antennas provided by the UE i. Each element of the matrix may therefore be DL channel state information for a channel between an RRU 104A-104N provided spatial dimension (e.g., an RRU 104A-104N transmit antenna, an RRU 104A-104N spatial beam, etc.) and a receive antenna of the UE where the elements of the matrix collectively cover each possible spatial dimension and UE i receive antenna pair. The scheduler control 214 can determine the matrix $H_i$ for each of the active UEs 102A-102K (e.g., thereby determining K matrices in this example). Alternatively or in addition, the scheduler control 214 can determine a combined matrix H corresponding to each of the active UEs 102A-102K. The combined matrix H can be an $N_T \times K_r$ matrix, where $K_r$ is the sum of all receive antennas collectively provided by all of the active UEs 102A-102K (e.g., $$\sum_{i=1}^{K} N_{r,i}$$

The scheduler control 214 can, for each active UE 102A-102K, determine a matrix norm (e.g., the L2-norm) of the matrix of estimated DL channel information corresponding to the respective UE 102A-102K. The matrix norm may represent a strength of a channel between the RRUs 104A-104N and the respective UE 102A-102K, where a larger matrix norm may represent a stronger channel.

When determining the matrix norms, the scheduler control 214 may treat each UE 102A-102K as an independent "user" and ultimately selects or does not select a UE 102A-102K to be served during the time slot being scheduled. However, the scheduler control 214 can instead treat each receive antenna of a UE 102A-102K as an independent "user" and select or not select a receive antenna of a UE 102A-102K to be served during the time slot being scheduled. Thus, instead of selecting users to be served during the time slot being scheduled at the UE 102A-102K level, the scheduler control 214 can select users to be served during the time slot being scheduled at the UE 102A-102K receive antenna level. This can result, for example, in some receive antennas of a particular UE 102A-102K being scheduled and other receive antennas of the same UE 102A-102K not being scheduled during the time slot. To make selections at the receive antenna level, the scheduler control 214 can separate the matrix associated with a UE 102A-102K into various column vectors (or separately determine each column vector), where each column vector is a $N_T \times 1$ vector associated with a particular active UE 102A-102K receive antenna and each element within the column vector includes DL channel state information for a channel between an RRU 104A-104N provided spatial dimension (e.g., a transmit antenna of an RRU 104A-104N, a spatial beam of an RRU 104A-104N, etc.) and the associated active UE 102A-102K receive antenna. The elements within a column vector may collectively cover each possible spatial dimension and associated active UE 102A-102K receive antenna pair. The scheduler control 214 can then determine a vector norm for each of these column vectors. Like the matrix norm, the vector norm may represent a strength of a channel between the RRUs 104A-104N and the associated active UE 102A-102K receive antenna, where a larger vector norm may represent a stronger channel.

The scheduler control 214 can then order the users (e.g., active UEs 102A-102K or active UE 102A-102K receive antennas). For example, the scheduler control 214 can factor channel strength, latency, and/or a fairness metric in determining how to order the users. As one example, the scheduler control 214 can determine an average throughput of each user over a period of time. Thus, if a user has not been served for a long period of time, the average throughput determined for the user may be a small value. Some users can transmit over multiple spatial dimensions simultaneously, and therefore the determined average throughput may be per spatial dimension. The scheduler control 214 can compute a fairness metric for each user by dividing the matrix norm or vector norm of the respective user by the average throughput of the respective user. The fairness metric can be represented mathematically as follows:

$$\frac{\|h_1\|^2}{T_1}, \frac{\|h_2\|^2}{T_2}, \ldots \frac{\|h_K\|^2}{T_K}$$

where $\|h_n\|^2$ represents a matrix norm associated with UE n or a vector norm associated with UE receive antenna n, and where $T_n$ represents an average threshold for user n (e.g., UE n or UE receive antenna n).

The scheduler control 214 can then order the users based on the fairness metric. For example, the scheduler control 214 can order the users such that the user having the highest fairness metric is ordered first, the user having the second highest fairness metric is ordered second, the user having the third highest fairness metric is ordered third, and so on.

Alternatively, in situations in which users can support multiple spatial dimensions simultaneously, the scheduler control 214 can determine a normalized throughput for each user to order the users. For example, the scheduler control 214 can determine an average throughput of each user over a period of time. The scheduler control 214 can then, for each user, determine a number of potential spatial dimensions that will be used by the respective user, and divide the average throughput of the respective user by the number of potential spatial dimensions that will be used by the respective user to form the normalized throughput for the respective user. The normalized throughput in this embodiment can be represented mathematically as follows:

$$T_i = \frac{\tilde{T}_i}{N_{L,i}}$$

where $T_i$ represents the normalized throughput of user i, $\tilde{T}_i$ represents the average throughput of user i, and $N_{L,i}$ represents the number of potential spatial dimensions (or number of potential layers) that will be used by user i. The scheduler control 214 can then determine the fairness metrics using the normalized throughputs rather than the average throughputs, and order the users using the fairness metrics as described above.

The scheduler control 214 can optionally consider other factors when ordering the users. For example, instead of or in addition to determining the fairness metric using average or normalized throughput, the scheduler control 214 can determine the fairness metric using latency priority (e.g., a quality of service (QoS) priority) and/or spectral efficiency measurements.

Once the users are ordered, the scheduler control 214 can determine a threshold based on the largest matrix norm or the largest vector norm. For example, the threshold can be the product of a constant and the largest matrix norm or the largest vector norm. The threshold can be represented mathematically as follows:

$$Th = c * \max_i(\|h_i\|)$$

where Th represents the threshold, c is the constant, and $$\max_i(\|h_i\|)$$

represents the largest matrix or vector norm.

The constant can be the same value for all users. For example, the constant can be the square root of 0.1. The value of the constant may be selected by the scheduler control 214, another component of the BBU 110, or an external computing system (not shown) that runs one or more computer simulations to identify an appropriate constant. Alternatively, the constant can initially be one value (e.g., the square root of 0.1), and then the scheduler control 214 can adaptively change the constant based on the BLER performance associated with one or more of the users (e.g., based on the BLER performance of one or more UEs 102A-102K, such as the UE 102A-102K associated with the largest matrix or vector norm; based on the BLER performance of one or more UE 102A-102K receive antennas, such as the UE 102A-102K receive antenna associated with the largest matrix or vector norm; etc.). In another alternative, the constant can be a value specific to a particular user, such that one constant is associated with each user. The scheduler control 214 can then change the value of a constant associated with a user based on the user's BLER performance, such as the BLER performance of the first hybrid automatic repeat request (HARM) transmissions. In other words, the scheduler control 214 can change the value of the constant based on interference experienced by the user from other simultaneously scheduled users. In particular, the scheduler control 214 can increase the constant value for a user if the user experiences interference from other simultaneously scheduled users, where the amount of the increase can be larger the more interference that is experienced. For example, the manner in which the scheduler control 214 adjusts the constant for a user i can be represented mathematically as follows:

$$c_i = c_i + s\Delta$$

where ci is the constant for user i, where $\Delta$ can be a small positive step size parameter (e.g., 0.1, 0.2, 0.3, etc.), and where s can be represented as follows:

$$s = sgn(BLER_{inst} - BLER_{target})$$

where $BLER_{inst}$ is the instantaneous BLER performance experienced by user i and $BLER_{target}$ is the target BLER performance desired for user i.

Using the determined threshold and the user order, the scheduler control 214 can begin the user (e.g., UE 102A-102K or UE 102A-102K receive antenna) and spatial dimension selection process. For example, the scheduler control 214 can select the user ordered first to be served during the time slot being scheduled. The scheduler control 214 can then compute QR decomposition(s) to determine which additional users should be selected to be served during the time slot being scheduled. For example, computation of the QR decompositions may allow the scheduler control 214 to determine whether the corresponding users would be associated with a spatial dimension that is roughly or approximately orthogonal (e.g., orthogonal by at least a threshold angle, such as 30°, 45°, 60°, 75°, 90°, etc.) to the spatial dimensions of other users already selected by the scheduler control 214 to be served during the time slot. In particular, the scheduler control 214 can, in the course of computing a QR decomposition, determine a measurement that represents a spatial orthogonality of a user relative to spatial elements of other users already included in the scheduled set (e.g., the amount of projection of the spatial channel of the user onto the spatial channel of one or more other users, such as other user(s) already scheduled during the time slot being scheduled, where the spatial channel of the user is completely orthogonal with the spatial channel of the other user(s) if there is no amount of projection of the spatial channel of the user onto the spatial channel(s) of the other user(s); the amount of overlap between the desired spatial beam to the user and the spatial beam(s) to one or more other users, such as other user(s) already scheduled during the time slot being scheduled, where the desired spatial beam to the user is completely orthogonal with the spatial beam(s) of the other user(s) if there is no overlap (e.g., the desired spatial beam to the user would not cause interference or leakage in the spatial beam(s) served to the other user(s) if there is no overlap); etc.) that can then be used to assess whether the user would be associated with a spatial dimension that is roughly or approximately orthogonal to the spatial dimensions of other users already selected by the scheduler control 214 to be served during the time slot. The measurement can also be referred to as representing a spatial orthogonality of a user with other user(s) selected to be served during the time slot being scheduled, or a spatial orthogonality between a spatial element of a user and spatial element(s) of other user(s) already selected to be in a scheduled set. Thus, the scheduler control 214 can iterate through each of the remaining users and, using the QR decomposition of the respective user, determine if the spatial dimension of the respective user is roughly orthogonal to the spatial dimensions of other users already selected to be served during the time slot.

If the spatial dimension of the respective user is roughly or approximately orthogonal to the spatial dimensions of other users already selected to be served during the time slot, then the scheduler control 214 can select the respective user to also be served during the time slot being scheduled. Otherwise, if the spatial dimension of the respective user is not roughly or approximately orthogonal (e.g., orthogonal by less than a threshold angle, such as 30°, 45°, 60°, 75°, 90°, etc.) to the spatial dimensions of other users already selected to be served during the time slot, then the scheduler control 214 can decline to select the respective user to be served during the time slot being scheduled and move on to the next user in the order to determine whether the next user should be selected to be served during the time slot being scheduled. The scheduler control 214 can repeat these operations until the maximum number of users that can be served during the same time slot are selected (e.g., K users, where K is less than or equal to N, and where N is the total number of spatial dimensions supported by the RRUs 104A-104N in the network environment 100) or until all users have been evaluated for possible selection.

As an illustrative example, the scheduler control 214 can iterate through each of the remaining users, in order starting with the second highest ordered user, and compute the QR decomposition for the respective user. Computing the QR decomposition for a user may include the scheduler control 214 computing a vector, and the scheduler control 214 can determine a vector norm of the vector, compare the vector norm of the vector to the determined threshold Th, and select the user to be served during the time slot being scheduled if the vector norm is greater than (or less than) the determined threshold Th. The vector norm of the vector may be a measurement that represents a spatial orthogonality of the user relative to spatial elements of other user(s), such as other user(s) already scheduled to be served during the time slot being scheduled. The process of iterating through the remaining users to compute a vector norm of the vector associated with the respective user and to compare the vector norm to the determined threshold may be the operations that the scheduler control 214 performs to determine whether the spatial dimension of the respective user is roughly or approximately orthogonal to the spatial dimensions of users already selected to be served during the time slot being scheduled. By selecting users that have roughly or approximately orthogonal spatial dimensions and not selecting users that do not have roughly or approximately orthogonal spatial dimensions with other selected user spatial dimensions, the scheduler control 214 can reduce future transmission interference during the time slot being scheduled.

The QR decomposition and user selection process for the highest ordered user can be represented mathematically as follows:

$$H_1 = Q_1 R_1 = \begin{bmatrix} \frac{h_1}{r} \end{bmatrix}[r]$$

$$H_s = [h_1]$$

where $H_1$ represents the QR decomposition (e.g., $Q_1 R_1$) of user 1 (e.g., the highest ordered user), $h_1$ represents the matrix or vector of DL channel state information for user 1, where r is the matrix or vector norm of $h_1$ (e.g., $\|h_1\|$), and where $H_s$ represents a matrix or vector of DL channel state information of users selected by the scheduler control 214 to be served during the time slot being scheduled. Here, $H_s$ currently only includes the matrix or vector of DL channel state information of user 1 because user 1 is the first and only user selected by the scheduler control 214 to be served during the time slot so far.

For the remaining users (e.g., the $K_r-1$ users remaining if $K_r$ is the total number of active users in the network environment 100), the QR decomposition and user selection process can be represented mathematically as follows:

$$H_{k-1} = [h_1, \ldots h_{k-1}] = Q_{k-1} R_{k-1}$$

where $H_{k-1}$ represents the QR decomposition (e.g., $Q_{k-1} R_{k-1}$) of user k−1, and where the scheduler control 214 starts k at 2 (e.g., the second highest ordered user) and increments k by 1 until reaching $K_r$ or until the maximum number of users have been scheduled. Given the QR decomposition of user k−1, the scheduler control 214 can compute the QR decomposition of user k as follows:

$$H_k = [H_{k-1} \ h_k] = [Q_{k-1} R_{k-1} \ h_k] = [Q_{k-1} \ r/r] \cdot \begin{bmatrix} R_{k-1} & p \\ 0 & r \end{bmatrix} = Q_k R_k$$

where p and r are vectors and are determined by the scheduler control 214 as follows:

$$p = Q_{k-1}^H h_k$$

$$r = h_k - Q_{k-1} p$$

$$r = \|r\|$$

The value r (e.g., a vector norm of vector r) may be a measurement that represents a spatial orthogonality of user k relative to the spatial element(s) of user(s) 1 to k−1 already selected to be served during the time slot being scheduled. The scheduler control 214 can then use the value r to determine whether to select or not select the user to be scheduled during the time slot. The scheduler control 214 can use the value r to determine to select the user to be scheduled during the time slot if the value r does satisfy the threshold Th, and can use the value r to determine to not select the user to be scheduled during the time slot if the value r does not satisfy the threshold Th. For example, if the value r is greater than the threshold Th (e.g., a measurement that represents a spatial orthogonality of user k relative to the spatial element(s) of user(s) 1 to k−1 already selected to be served during the time slot being scheduled is greater than the threshold Th), then the scheduler control 214 determines that the spatial dimension of user k is roughly or approximately orthogonal to the spatial dimension(s) of other user(s) already selected to be served during the time slot, and the scheduler control 214 selects user k to also be served during the time slot. In other words, the scheduler control 214 can update $H_s$ to be as follows:

$$H_s = [H_s h_k]$$

Otherwise, if the value r is less than or equal to the threshold Th (e.g., a measurement that represents a spatial orthogonality of user k relative to the spatial element(s) of user(s) 1 to k−1 (e.g., user(s) that have DL channel state information represented within $H_s$) already selected to be served during the time slot being scheduled is less than or equal to the threshold Th), then the scheduler control 214 determines that the spatial dimension of user k is not roughly or approximately orthogonal to the spatial dimension(s) of other user(s) already selected to be served during the time slot and declines to select user k to also be served during the time slot. After selecting or not selecting user k to be served during the time slot, the scheduler controller 214 determines whether k equals $K_r$. If k equals $K_r$ or the maximum number of users that can be scheduled during the time slot are scheduled (e.g., where the maximum number of users that can be scheduled during the time slot is equal to or less than the total number of spatial dimensions or total number of transmit antennas provided by the RRUs 104A-104N), the scheduler control 214 has completed the QR decomposition and user selection process. Otherwise, if k is less than $K_r$ and the maximum number of users that can be scheduled during the time slot are not scheduled, the scheduler control 214 repeats the QR decomposition and user selection process for user k+1.

Thus, the scheduler control 214 can perform the operations described herein to select users with low complexity. For example, the QR decomposition process may ensure that the condition number of $H_s$ is approximately controlled by the threshold Th with low complexity. When $H_s$ has a reasonably good condition number (e.g., a very small value close to 0, such as 1, 0.1, 0.05, 0.01, etc.), the matrix inversion may not put too much transmitting power on weak Eigen directions that usually have more parameter estimation errors. Thus, this process may boost the robustness of the network environment 100 and reduce various estimation errors.

After repeating the QR decomposition and user selection process until either the maximum number of users that can be scheduled during the time slot are scheduled or all users have been evaluated, the scheduler control 214, another component of the BBU 110, and/or one or more RRUs 104A-104N can compute the DL precoder (e.g., the downlink regularized zero forcing (RZF) precoder). The scheduler control 214, the other component of the BBU 110, and/or one or more RRUs 104A-104N can use an identification of the selected users, estimated DL channel information for the selected users, and/or QR decompositions of the selected users to determine the DL precoder. In particular, the scheduler control 214 can output $H_s$, an identification of the selected users (e.g., $K_s$), and the QR decompositions of the selected users (e.g., $Q_s$ and $R_s$) for use by another component if the scheduler control 214 itself does not compute the DL precoder.

For example, the DL precoder computation can be represented mathematically as follows:

$$P_{RZF\_sel} = H_s \cdot (H_s^H \cdot H_s + \Lambda)^{-1} = H_s \cdot (R_s^H \cdot R_s + \Lambda)^{-1}$$

where $P_{RZF\_sel}$ represents the DL precoder, and $\Lambda$ represents a diagonal loading matrix.

After the users are selected for a time slot, the RRU(s) 104A-104N that serve a particular UE 102A-102K (or UE 102A-102K receive antenna) during the time slot can each transmit the same downlink data to the UE 102A-102K (or UE 102A-102K receive antenna) during the time slot using one or more spatial beams. The UE 102A-102K can then combine the received data (e.g., by selecting the best spatial beam, by performing a soft combine, by performing a non-coherent combine, by performing a coherent combine, etc.) and perform any corresponding operations.

As described herein, the scheduler control 214 can use the user selection for UL transmissions as well, or can separately select users for UL transmissions. If the scheduler control 214 selects users separately for UL transmissions, the scheduler control 214 can select users for a particular frequency wholeband or sub-band. The scheduler control 214 can perform the same operations described above to select a particular user and spatial dimension grouping to serve during the same time slot. However, the scheduler control 214 may not need to determine any DL channel state information. Rather, the scheduler control 214 can simply use the UL channel state information obtained from the channel state data store 230, and the UL channel state information can be substituted for the DL channel state information in any computations performed by the scheduler control 214. Thus, for each user, the scheduler control 214 can determine a matrix or vector of UL channel state information, where each element in the matrix or vector corresponds to a particular spatial dimension (e.g., an RRU 104A-104N receive antenna) and a UE 102A-102K transmit antenna (e.g., a transmit antenna of the respective user). In other words, RRU 104A-104N receive antennas and UE 102A-102K transmit antennas may be evaluated for UL scheduling rather than RRU 104A-104N transmit antennas and UE 102A-102K receive antennas. In addition, the BLER performance that may be used to determine the constant may be the BLER performance of one or more RRUs 104A-104N receive antennas rather than of one or more UE 102A-102K receive antennas. Furthermore, the scheduler control 214 may not necessarily compute a precoder after selecting the users to serve during the time slot being scheduled for UL transmissions. However, the scheduler control 214 may compute receiver beamforming weights so that one or more RRUs 104A-104N can receive data from multiple UEs 102A-102K simultaneously.

Figure 3:
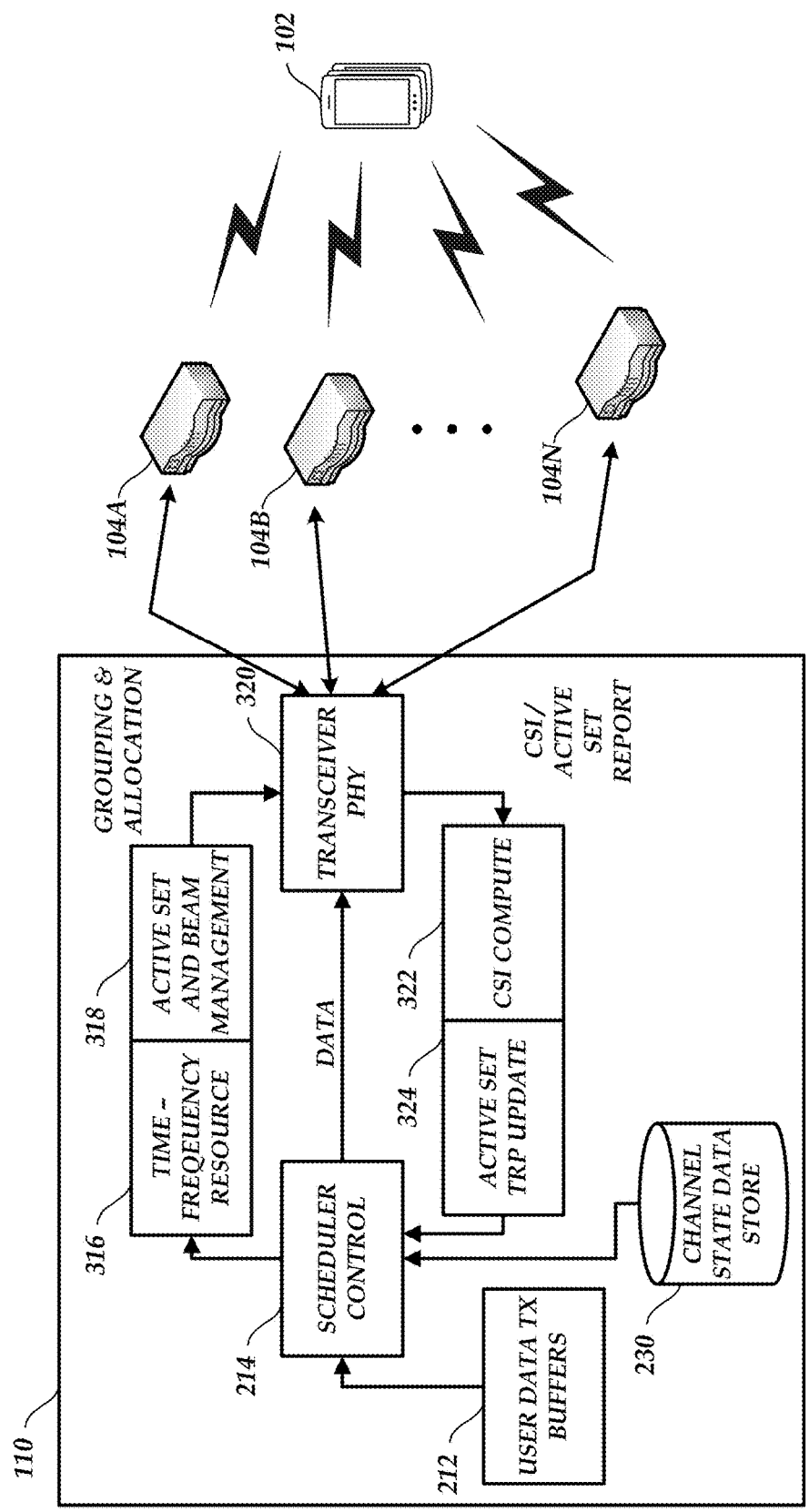
FIG. 3 is a schematic diagram illustrating a cooperative MIMO wireless network that includes the BBU of FIG. 1 according to an embodiment.

FIG. 3 is a schematic diagram illustrating a cooperative MIMO wireless network 300 that includes the BBU 110 according to an embodiment. In this embodiment, the RRUs 104A-104N may operate as RRUs or serving nodes, and the BBU 110 may select users (e.g., UEs 102, UE 102 receive antennas, etc.) to be served by one or more RRUs 104A-104N during the same time slot allocated for DL or UL transmissions over one or more spatial dimensions, and/or schedule data transmissions over the spatial dimension(s) selected to serve the users.

As illustrated in FIG. 3, the baseband unit 110 includes user data TX buffers 212, the scheduler control 214, a time/frequency resource allocation block 316, an active set and beam management block 318, a transceiver 320, a CSI computation block 322, an active set serving node update block 324, and the channel state data store 230. The BBU 110 can include any suitable physical hardware to implement the illustrated blocks. For example, the BBU 110 can include a processor and computer readable storage to implement any suitable blocks shown in FIG. 3. The cooperative MIMO wireless network 300 also includes the RRUs 104A-104N and one or more UEs 102. The cooperative MIMO wireless network 300 optionally includes other RRUs 104, not shown.

The BBU 110 includes a scheduler that selects users to serve over one or more spatial dimensions during the same time slot and schedules user data for wireless transmission between the RRUs 104A-104N and UEs 102 over various spatial dimensions (e.g., spatial beams, channels, etc.). The scheduler can perform the QR decomposition and user selection process described herein to select users to serve during the same time slot. The scheduler can also schedule DL data traffic for simultaneous transmission to multiple UEs 102, can schedule DL data traffic in a time division multiplexed fashion such that DL data traffic is transmitted to one UE 102 during a first time slot and is transmitted to a second UE 102 during a second time slot after (or before) the first time slot, can schedule UL data traffic for simultaneous transmission by multiple UEs 102, and can schedule UL data traffic in a time division multiplexed fashion such that UL data traffic is transmitted by one UE 102 during a first time slot and is transmitted by a second UE 102 during a second time slot after (or before) the first time slot. The RRUs 104 can alternatively be referred to as transmission points for DL data transmission. The scheduler can schedule data from any suitable number of RRUs 104 to any suitable number of UEs 102. The scheduler can include the user data queue TX buffers 212, the scheduler control 214, the time/frequency resource allocation block 316, the active set and beam management block 318, the CSI computation block 322, the active set serving node update block 324, and/or the channel state data store 230.

The transceiver 320 can provide a UE report from the UE 102 to the scheduler. For example, the UE report can include spatial beam link strengths, spatial beam link quality, and/or other CSI suitable for allowing the scheduler to select users to be served over one or more spatial dimensions during the same time slot, schedule DL data transmissions, and/or schedule UL data transmissions. The CSI computation block 322 can compute CSI data from data in the UE report. The active set serving node update block 324 can determine an updated active set for one or more UEs 102 based on updated link strength information provided by the UE(s) 102 (e.g., provided by the UE(s) 102 in response to receiving DL data traffic) and/or by executing the QR decomposition and user selection process described herein. In some instances, the active set serving node update block 324 can determine an updated active set for a subset of one or more antennas of a UE 102. The active set serving node update block 324 can use any suitable metrics disclosed herein to update an active set associated with a UE 102.

The updated active set data is provided to the scheduler control 214. The user data queue TX buffers 212 can provide user data (e.g., DL user data) to the scheduler control 214. The scheduler control 214 provides user data to the transceiver 320 and also provides instructions to the time/frequency resource allocation block 316. The time/frequency resource allocation block 316 can schedule timing and frequency of DL and/or UL data transmission from and/or to RRUs 104 (e.g., generate scheduling data), which can be forwarded to the RRUs 104 via the transceiver 320. This can avoid timing conflicts and conflicts in the frequency domain. The active set and beam management block 318 can select RRUs 104 and/or specific spatial beams offered by these RRUs 104 for providing wireless transmission services to UEs 102, and create corresponding active sets for the UEs 102. The active set and beam management block 318 can group DL data transmissions and manage beamforming from the RRUs 104 to the UEs 102. The transceiver 320 provides data for transmission by the RRUs 104 to UEs 102.

As illustrated in FIG. 3, the scheduler can cause a network system of the cooperative MIMO wireless network 300 to wirelessly transmit first user data to a first UE 102 across one or more spatial beams or spatial dimensions, to transmit second user data to a second UE 102 across one or more spatial beams or spatial dimensions, and so on. The scheduler can cause the transmissions of the first user data, the second user data, etc. to occur simultaneously and/or at different times. Moreover, the scheduler can cause a network system of the cooperative MIMO wireless network 300 to wirelessly transmit user data to any suitable number of UEs 102 across one or more spatial beams or spatial dimensions served by one or more RRUs 104.

Figure 4:
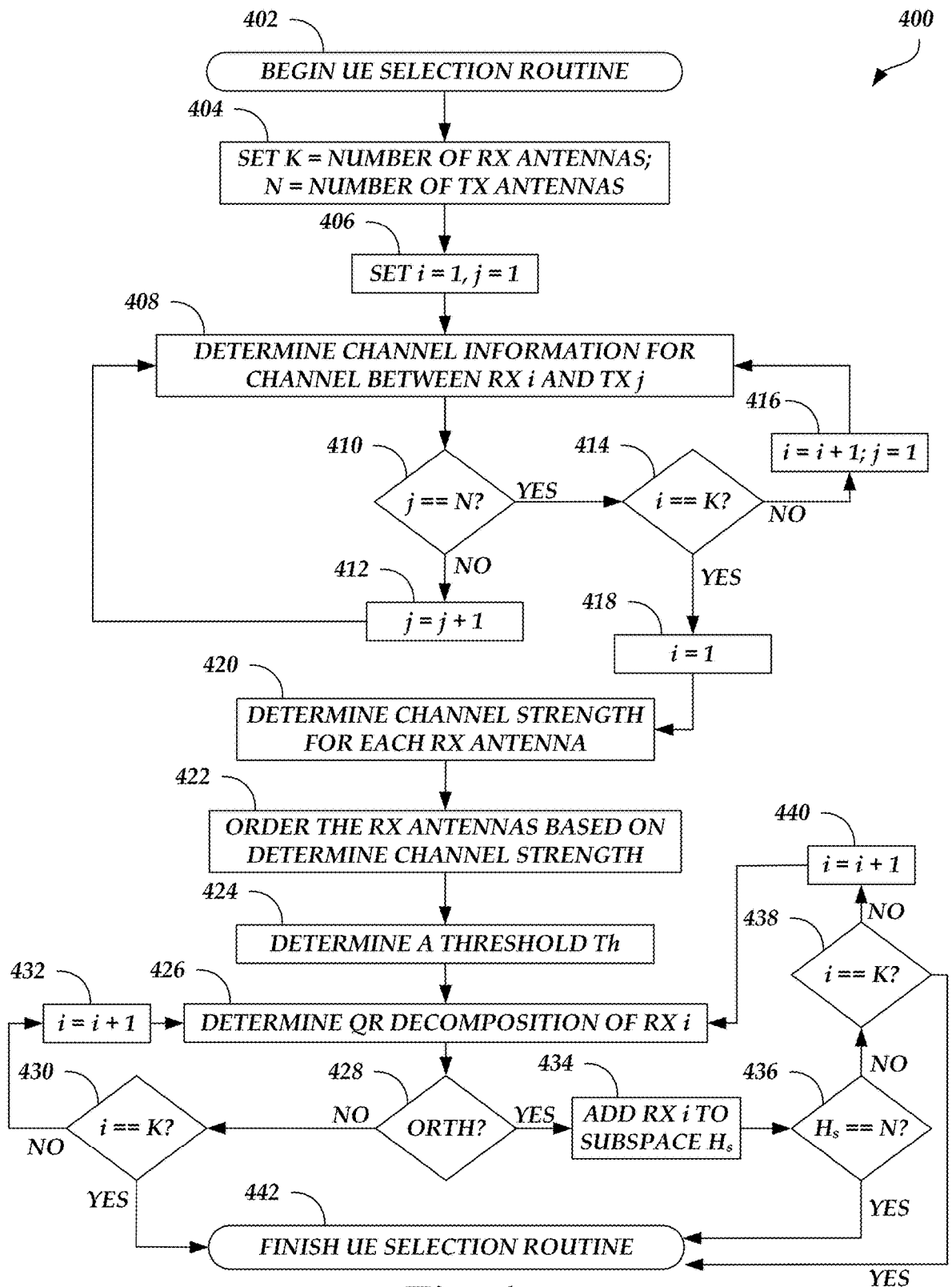
FIG. 4 is a flow diagram depicting a UE selection routine illustratively implemented by an RRU and/or a BBU to select which users to serve during the same time slot, according to one embodiment.

FIG. 4 is a flow diagram depicting a UE selection routine 400 illustratively implemented by an RRU and/or a BBU to select which users to serve during the same time slot, according to one embodiment. As an example, one or more RRUs 104A-104N of FIGS. 1 and 3, RRU 990 of FIG. 9, the BBU 110 of FIGS. 1-3, and/or BBU 902 of FIG. 9 can be configured to execute the UE selection routine 400. For simplicity and ease of explanation, the UE selection routine 400 is described with respect to a "user" being a UE 102 receive antenna and for DL transmissions. However, the UE selection routine 400 can also be performed in situations in which a "user" is an entire UE 102 (e.g., by having variable i referencing a UE rather than a receive antenna and/or replacing "RX antenna" with "UE" in the process described below). The UE selection routine 400 can also be performed for UL transmissions, with the "user" being a UE 102 transmit antenna (e.g., by having variable i referencing a UE 102 transmit antenna and having variable j referencing an RRU 104 receive antenna and/or replacing "RX antenna" with "TX antenna" and replacing "TX antenna" with "RX antenna" in the process described below) or the entire UE 102 (e.g., by having variable i referencing a UE 102 rather than an antenna and having variable j referencing an RRU 104 receive antenna and/or replacing "RX antenna" with "UE" and replacing "TX antenna" with "RX antenna" in the process described below). The UE selection routine 400 begins at block 402 and is executed for selecting users to serve during the same time slot.

At block 404, a variable K is set equal to a number of receive (RX) antennas present in the network environment, and a variable N is set equal to a number of transmit (TX) antennas present in the network environment. The number of RX antennas may be the total number of RX antennas collectively provided by the UEs 102 in the network environment, and the number of TX antennas may be the total number of TX antennas collectively provided by the RRUs 104 in the network environment. More generally, the variable N can be set to the total number of spatial dimensions collectively provided by the RRUs 104 in the network environment. The variable N may represent the maximum number of users (e.g., UE 102 RX antennas) that can be selected to be served during the time slot being scheduled.

At block 406, a variable i is set equal to 1, and a variable j is set equal to 1. Variable i may identify a particular RX antenna, and variable j may identify a particular TX antenna.

At block 408, channel information is determined for a channel between RX antenna i and TX antenna j. For example, the channel information may be DL channel state information (e.g., DL channel coefficients) for the channel, and can be derived from UL channel state information obtained from, for example, the channel state data store 230.

At block 410, a determination is made as to whether the variable j equals the variable N. If the two variables are equal, this may indicate that channel information has been determined for each channel between the RX antenna i and the TX antennas in the network environment. Thus, the UE selection routine 400 then proceeds to block 414. Otherwise, if the two variables are not equal, this may indicate that channel information has not been determined for each channel between the RX antenna i and the TX antennas in the network environment. Thus, the UE selection routine 400 then proceeds to block 412.

At block 412, the variable j is incremented by 1. After incrementing the variable j, the UE selection routine 400 reverts back to block 408 so additional channel information can be determined.

At block 414, a determination is made as to whether variable i equals variable K. If the two variables are equal, this may indicate that channel information has been determined for each pair of RX antennas and TX antennas in the network environment. Thus, the UE selection routine 400 then proceeds to block 418. Otherwise, if the two variables are not equal, this may indicate that channel information has not been determined for each pair of RX antennas and TX antennas in the network environment. Thus, the UE selection routine 400 then proceeds to block 416.

At block 416, the variable i is incremented by 1 and the variable j is reset to 1. After incrementing the variable i and resetting the variable j, the UE selection routine 400 reverts back to block 408 so additional channel information can be determined.

At block 418, the variable i is reset to 1. After resetting the variable i, the UE selection routine 400 proceeds to block 420.

At block 420, channel strength for each RX antenna is determined. For example, the channel strength can be determined for an RX antenna by taking a vector norm of a vector of channel information associated with the RX antenna.

At block 422, the RX antennas are ordered based on the determined channel strength. For example, the RX antennas can be ordered based on a fairness metric determined using the determined channel strength and average or normalized throughput.

At block 424, a threshold Th is determined. For example, the threshold Th may be based on the highest vector norm and/or a constant value that may or may not remain static.

At block 426, a QR decomposition of RX antenna i is determined. For example, variable i may initially be set to 1 and refer to the highest ordered RX antenna. Each next highest value of the variable i may refer to the next lower ordered RX antenna. As an illustrative example, if the variable i is equal to 2, the variable i may refer to the second highest ordered RX antenna. If the variable i is equal to 3, the variable i may refer to the third highest ordered RX antenna, and so on.

At block 428, a determination is made as to whether a spatial dimension of RX antenna i is roughly or approximately orthogonal to the spatial dimension(s) of any RX antennas already selected to be served during the time slot being scheduled. For example, the norm of a vector r determined using the QR decomposition of RX antenna i can be compared to the threshold Th. If the norm of the vector r is greater than the threshold Th, then the spatial dimension of RX antenna i is roughly or approximately orthogonal to the spatial dimension(s) of any RX antennas already selected to be served during the time slot being scheduled. Here, the spatial dimension of RX antenna 1 is roughly or approximately orthogonal given that no other RX antennas have yet to be selected to be served during the time slot being scheduled. If the spatial dimension of RX antenna i is roughly or approximately orthogonal to the spatial dimension(s) of any RX antennas already selected to be served during the time slot being scheduled, then the UE selection routine 400 proceeds to block 434. Otherwise, if the spatial dimension of RX antenna i is not roughly or approximately orthogonal to the spatial dimension(s) of any RX antennas already selected to be served during the time slot being scheduled, then the UE selection routine 400 proceeds to block 430.

At block 430, a determination is made as to whether variable i equals variable K. If the two variables are equal, this may indicate that all RX antennas have been evaluated for possible selection. Thus, the UE selection routine 400 then proceeds to block 442 and the UE selection routine 400 is complete. Otherwise, if the two variables are not equal, this may indicate that not all of the RX antennas have been evaluated for possible selection and additional RX antennas could be selected. Thus, the UE selection routine 400 then proceeds to block 432.

At block 432, the variable i is incremented by 1. After incrementing the variable i, the UE selection routine 400 reverts back to block 426 so another QR decomposition can be performed to determine whether another RX antenna can be selected to be served during the time slot being scheduled.

At block 434, the RX antenna i is added to subspace $H_s$, which is a data structure identifying the RX antennas that have been selected to be served during the time slot being scheduled (and which stores channel information for each of the selected RX antennas). In other words, the RX antenna i is selected to be served during the time slot being scheduled given that the spatial dimension of RX antenna is roughly or approximately orthogonal to the spatial dimension(s) of other RX antennas already selected.

At block 436, a determination is made as to whether the size of subspace $H_s$ equals the variable N. If the size of subspace $H_s$ equals variable N, this may indicate that the maximum number of RX antennas have been selected and no more RX antennas can be selected to be served during the time slot being scheduled. Thus, the UE selection routine 400 then proceeds to block 442 and the UE selection routine 400 is complete. Otherwise, if the size of subspace $H_s$ does not equal variable N, this may indicate that additional RX antennas could be selected to be served during the time slot being scheduled. Thus, the UE selection routine 400 then proceeds to block 438.

At block 438, a determination is made as to whether variable i equals variable K. If the two variables are equal, this may indicate that all RX antennas have been evaluated for possible selection. Thus, the UE selection routine 400 then proceeds to block 442 and the UE selection routine 400 is complete. Otherwise, if the two variables are not equal, this may indicate that not all of the RX antennas have been evaluated for possible selection and additional RX antennas could be selected. Thus, the UE selection routine 400 then proceeds to block 440.

At block 440, the variable i is incremented by 1. After incrementing the variable i, the UE selection routine 400 reverts back to block 426 so another QR decomposition can be performed to determine whether another RX antenna can be selected to be served during the time slot being scheduled.

Figure 5A:
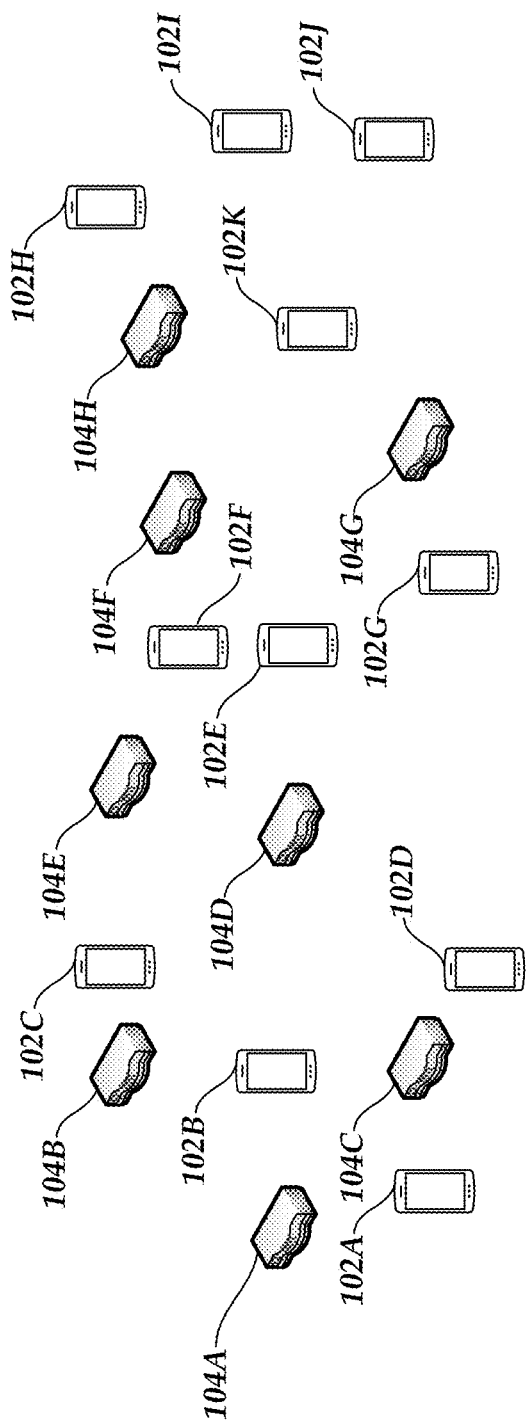
FIGS. 5A-5B are diagrams illustrated an example selection of UEs to be served during the same time slot, according to an embodiment.
Figure 5B:
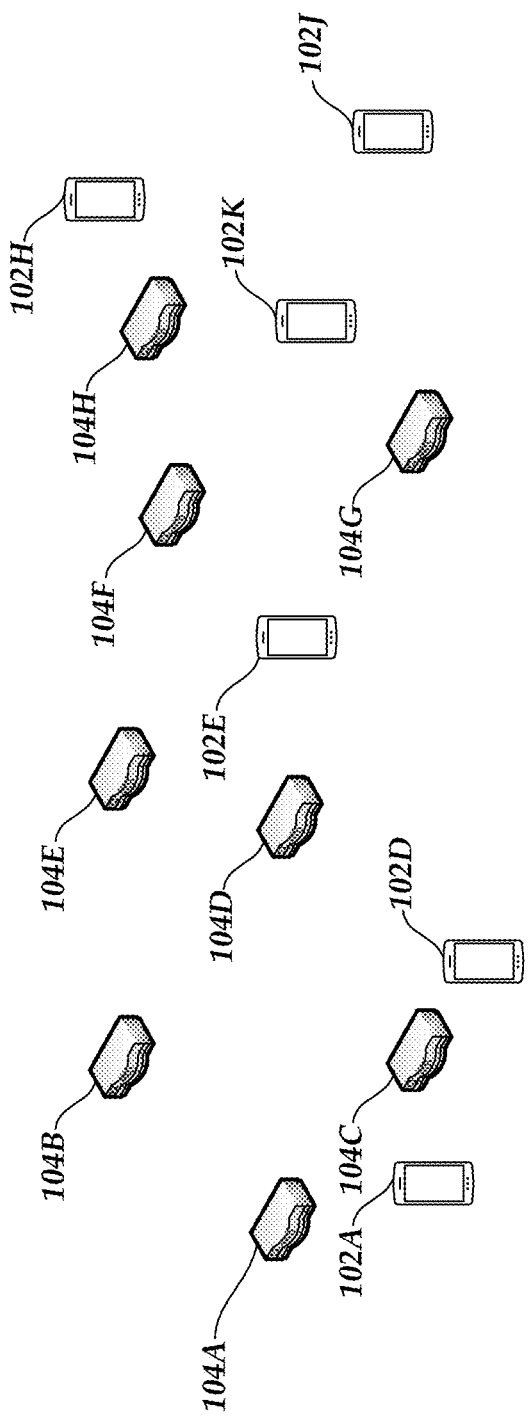

FIGS. 5A-5B are diagrams illustrated an example selection of UEs 102 to be served during the same time slot, according to an embodiment. FIGS. 5A-5B illustrate the selection process for DL communications. However, the same techniques can be applied to make selections for UL communications. Furthermore, FIGS. 5A-5B illustrate the selection process with "users" being UEs 102. However, the same techniques can be applied to make selections with "users" being UE 102 receive antennas.

As illustrated in FIG. 5A, eleven active UEs 102A-102K are present in the network environment, and eight RRUs 104A-104H are present in the network environment. Assuming that each of the RRUs 104A-104H has one transmit antenna, the total number of active UEs 102A-102K that can be served during the same time slot is eight (e.g., the total number of RRUs 104A-104H multiplied by the number of transit antennas that each RRU 104A-104H has). Because there are more active UEs 102A-102K present in the network environment than can be served during the same time slot, the BBU 110 can perform the QR decomposition described herein to identify which UEs 102A-102K, if any, can be served during the same time slot.

Here, the BBU 110 selects active UEs 102A, 102D, 102E, 102H, 102J, and 102K to be served during the same time slot, as illustrated in FIG. 5B. While the BBU 110 could have selected up to eight UEs 102A-102K to serve simultaneously during the same time slot, the BBU 110 has determined that only six UEs 102 are associated with spatial dimensions that are roughly or approximately orthogonal with each other. Thus, the BBU 110 has selected fewer than eight UEs 102A-102K to serve simultaneously during the same time slot.

Figure 6:
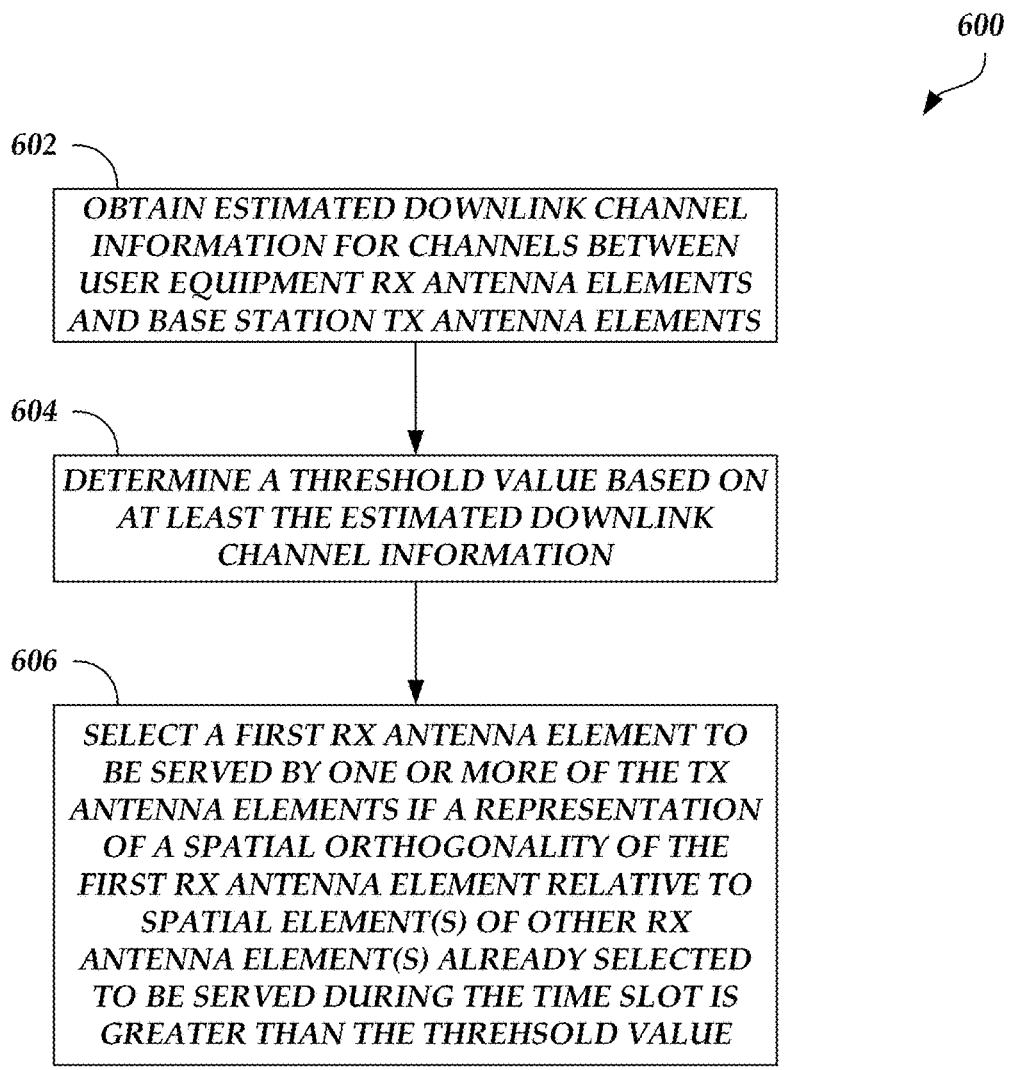
FIG. 6 is a flow diagram depicting a user selection routine for DL transmissions based on a threshold illustratively implemented by a BBU and/or one or more RRUs, according to one embodiment.

FIG. 6 is a flow diagram depicting a user selection routine 600 for DL transmissions based on a threshold illustratively implemented by a BBU and/or one or more RRUs, according to one embodiment. As an example, the BBU 110 or 902 and/or one or more RRUs 104 or 990 can be configured to execute the user selection routine 600. The user selection routine 600 begins at block 602.

At block 602, estimated downlink channel information is obtained for channels between UE RX antenna elements and base station (e.g., RRU) TX antenna elements. For example, the estimated DL channel information can be obtained using UL channel information obtained from UL pilot signals. The estimated downlink channel information is optionally subject to a scaling correct as a result of calibration between DL and UL RF chains.

At block 604, a threshold value is determined based on at least the estimated downlink channel information. For example, matrix or vector norms can be computed using the estimated downlink channel information (e.g., representing channel strength), and the threshold value can be based on a product of a constant value and the highest computed matrix or vector norm. The constant value can be the same for all UEs or UE RX antenna elements, can be different for some or all of the UEs or UE RX antenna elements, and/or can be adjusted over time based on, for example, BLER performance of one or more UE RX antenna elements.

At block 606, a first RX antenna element is selected to be served by one or more of the TX antenna elements if a representation of a spatial orthogonality of the first RX antenna element relative to spatial element(s) of other RX antenna element(s) already selected to be served during the time slot is greater than the threshold value. For example, the QR decomposition of the first RX antenna element can be computed. As part of the computation, a vector r can be determined, and a norm of the vector r can be the representation of the spatial orthogonality of the first RX antenna element relative to spatial element(s) of other RX antenna element(s) already selected to be served during the time slot. If the representation of the spatial orthogonality of the first RX antenna relative to spatial element(s) of other RX antenna element(s) already selected to be served during the time slot is greater than the threshold value, this may indicate that the spatial dimension of the first RX antenna is roughly or approximately orthogonal to the spatial dimension(s) of other RX antennas already selected to be served during the time slot being scheduled.

Figure 7:
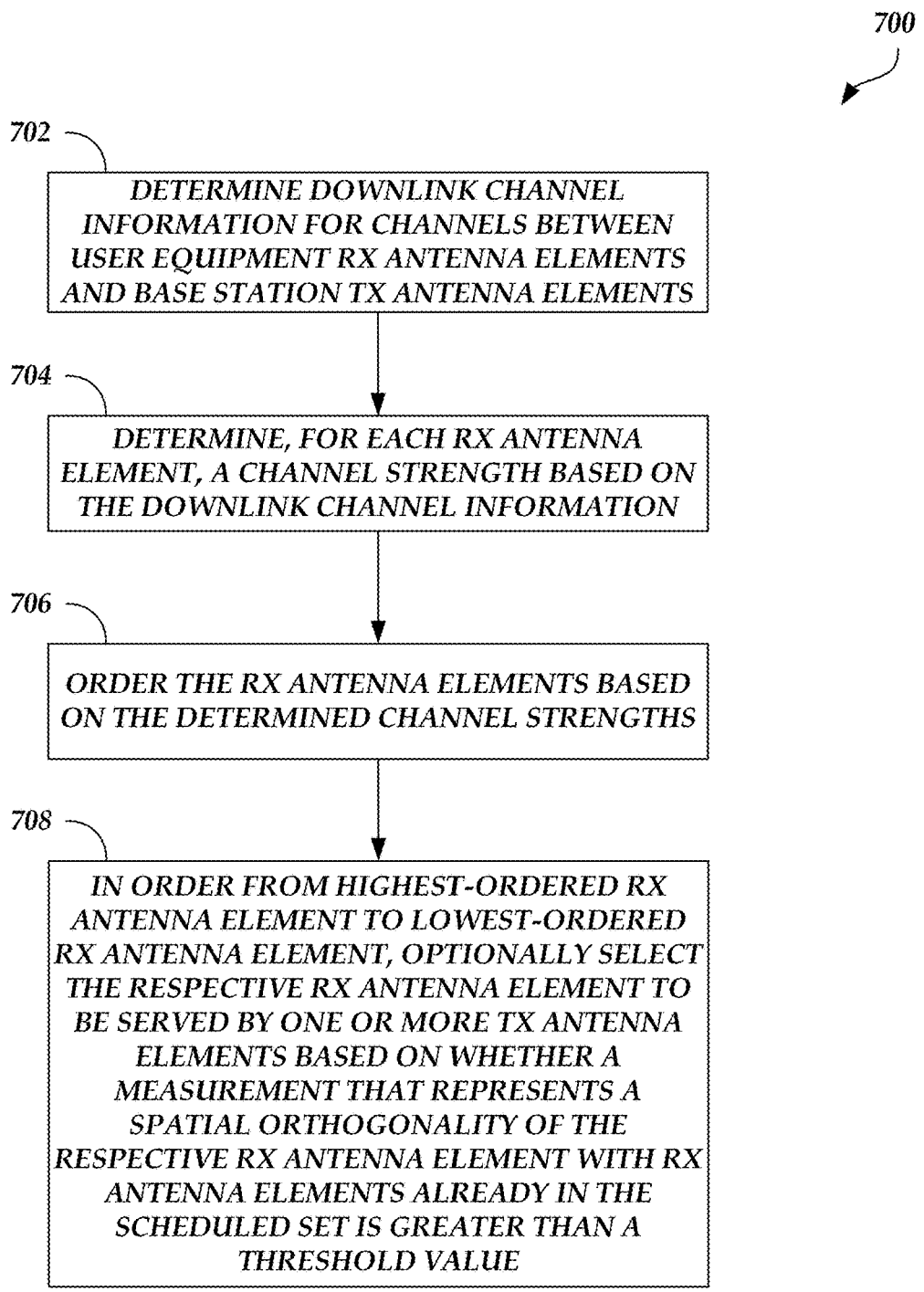
FIG. 7 is a flow diagram depicting a user selection routine for DL transmissions illustratively implemented by a BBU and/or one or more RRUs, according to one embodiment.

FIG. 7 is a flow diagram depicting a user selection routine 700 for DL transmissions illustratively implemented by a BBU and/or one or more RRUs, according to one embodiment. As an example, the BBU 110 or 902 and/or one or more RRUs 104 or 990 can be configured to execute the user selection routine 700. The user selection routine 700 begins at block 702.

At block 702, downlink channel information is determined for channels between UE RX antenna elements and base station (e.g., RRU) TX antenna elements. For example, the DL channel information can be determined using UL channel information obtained from UL pilot signals.

At block 704, for each RX antenna element, a channel strength is determined based on the downlink channel information. For example, matrix or vector norms can be computed using the downlink channel information to determine channel strengths for each of the RX antenna elements.

At block 706, the RX antenna elements can be ordered based on the determined channel strengths. For example, a fairness metric can be determined for each RX antenna element based on the channel strength of the respective RX antenna element and an average or normalized throughput of the respective RX antenna element. The RX antenna elements can then be ordered based on the value of their fairness metrics, with the RX antenna element having the highest fairness metric being ordered first and the RX antenna element having the lowest fairness metric being ordered last.

At block 708, in order from highest-ordered RX antenna element to lowest-ordered RX antenna element, the respective RX antenna element can be optionally selected to be served by one or more TX antenna elements based on whether a measurement that represents a spatial orthogonality of the respective RX antenna element with RX antenna elements already in a scheduled set (e.g., a spatial orthogonality of the respective RX antenna element relative to spatial element(s) of other RX antenna elements already selected to be served during the time slot) is greater than a threshold value (where the threshold value can be the threshold Th). For example, the QR decomposition of the RX antenna elements can be computed and used to determine a measurement that represents a spatial orthogonality of an RX antenna element with RX antenna elements already in a scheduled set (e.g., value r). The measurement can then be compared to the threshold value, where a spatial dimension of the respective RX antenna element is orthogonal to the spatial dimensions of RX antenna elements already selected to be served if the measurement is greater than the threshold value.

Figure 8:
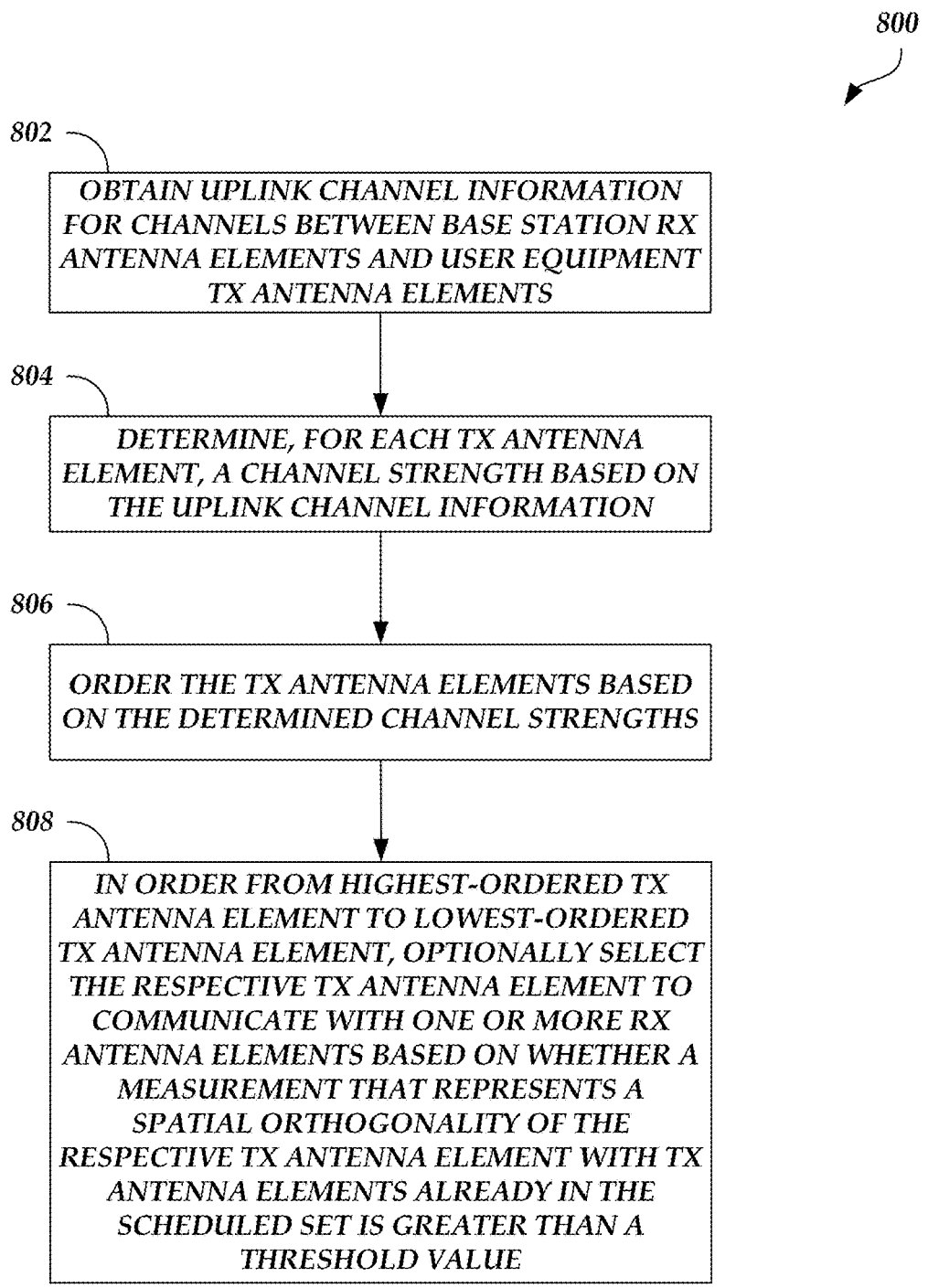
FIG. 8 is a flow diagram depicting a user selection routine for UL transmissions illustratively implemented by a BBU and/or one or more RRUs, according to one embodiment.

FIG. 8 is a flow diagram depicting a user selection routine 800 for UL transmissions illustratively implemented by a BBU and/or one or more RRUs, according to one embodiment. As an example, the BBU 110 or 902 and/or one or more RRUs 104 or 990 can be configured to execute the user selection routine 800. The user selection routine 800 begins at block 802.

At block 802, uplink channel information is obtained for channels between base station (e.g., RRU) RX antenna elements and UE TX antenna elements. For example, the UL channel information can be obtained from UL pilot signals.

At block 804, for each TX antenna element, a channel strength is determined based on the uplink channel information. For example, matrix or vector norms can be computed using the uplink channel information to determine channel strengths for each of the TX antenna elements.

At block 806, the TX antenna elements can be ordered based on the determined channel strengths. For example, a fairness metric can be determined for each TX antenna element based on the channel strength of the respective TX antenna element and an average or normalized throughput of the respective TX antenna element. The TX antenna elements can then be ordered based on the value of their fairness metrics, with the TX antenna element having the highest fairness metric being ordered first and the TX antenna element having the lowest fairness metric being ordered last.

At block 808, in order from highest-ordered TX antenna element to lowest-ordered TX antenna element, the respective TX antenna element can be optionally selected to communicate with one or more RX antenna elements based on whether a measurement that represents a spatial orthogonality of the respective TX antenna element with TX antenna elements already in a scheduled set (e.g., a spatial orthogonality of the respective TX antenna element relative to spatial element(s) of other TX antenna elements already selected to communicate during the time slot) is greater than a threshold value (where the threshold value can be the threshold Th). For example, the QR decomposition of the TX antenna elements can be computed and used to determine a measurement that represents a spatial orthogonality of a TX antenna element with TX antenna elements already in a scheduled set (e.g., value r). The measurement can then be compared to the threshold value, where a spatial dimension of the respective TX antenna element is orthogonal to the spatial dimensions of TX antenna elements already selected to communicate if the measurement is greater than the threshold value.

Figure 9:
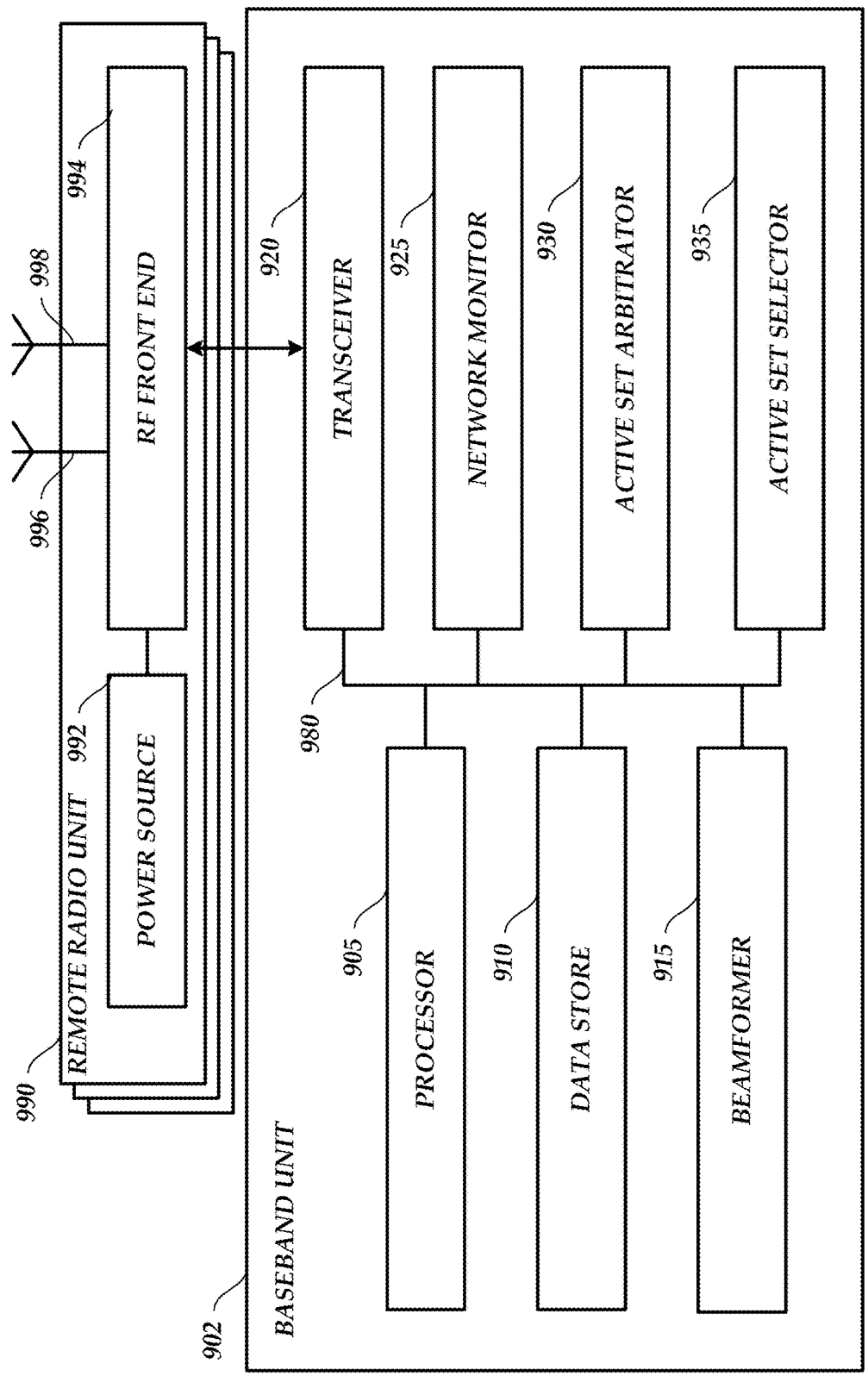
FIG. 9 is a block diagram illustrating an example baseband unit and remote radio unit according to an embodiment.

FIG. 9 is a block diagram illustrating an example baseband unit 902 and remote radio unit 990 according to an embodiment. The baseband unit 902 may be coupled with at least one remote radio unit 990. The remote radio unit 990 may include at least a first antenna 996 and a second antenna 998 for MIMO wireless communications. Any antenna disclosed herein, such as the antenna 996 or the antenna 998, can be referred to as antenna element. The first antenna 996 and the second antenna 998 may be coupled with a RF front end 994. The RF front end 994 may process signals received via the first antenna 996 and the second antenna 998. Part of processing a signal may include transmitting the signal to a transceiver 920 included in the BBU 902.

A processor 905 may receive signals received by the transceiver 920. The processor 905 may be configured to determine a type of the signal. For example, if the signal includes a request for connection services, the processor 905 may provide the signal to an active set selector 935. The active set selector 935 may be configured to identify an active set of serving nodes to provide the requested downlink data transmission service. The active set selector 935 can also identify which users to schedule during the same time slot by performing QR decompositions, as described herein. The active set selector 935 can identify the active set for a UE based on information associated with the UE. Alternatively or additionally, the active set selector 935 can identify the active set for a UE based on information associated with one or more other UEs. In some instances, the active set selector 935 can identify specific spatial beam(s) selected to serve a UE. The BBU 902 may include a network monitor 925 to detect characteristics of the network such as the number of UEs served by each RRU, network data transmission load, and/or the like. The active set selector 935 may receive the network characteristics from the network monitor 925 as a factor considered when selecting spatial beam(s) to serve a UE and/or identifying an active set for a UE.

A beamformer 915 may be included in the BBU 902 to further identify parameters for the serving nodes (e.g., RRUs) included in an active set. The parameters may include one or more of transmission mode, time, frequency, power, beamforming matrix, tone allocation, or channel rank. The beamformer 915 may determine optimal parameters for RRUs coupled with the BBU 902 that facilitate a network-wide optimization of downlink data transmissions. In some implementations, the active set selector 935 determines an active set for a UE based, in part, on information provided by the UE. In other implementations, a UE may provide a requested active set. The BBU 902 may include an active set arbitrator 930 to reconcile a requested active set with an active set selected by the active set selector 935. The active set arbitrator 930 may compare a requested set of serving nodes to the serving nodes identified by the active set selector 935. The comparison may include ordering the serving nodes according to the UE recommendation. In some implementations, the active set arbitrator 930 may provide a message to the UE indicating confirmation or other assessment for a requested active set. For example, if the UE requested nodes A and B but the BBU 902 identified only B in the active set, the message may include a code indicating a partial match for the active set. Other status codes may be included to facilitate efficient communication and assessment of requested active sets. The active set arbitrator 930 may additionally or alternatively compare a requested transmission mode to the transmission mode identified by the active set selector 935 or other element of the BBU 902.

The BBU 902 may include a data store 910. The data store 910 may include instructions that can be executed by the processor 905 to implement the features described herein. In some implementations, the data store 910 may retain active sets or other scheduling information assigned to UEs served by the BBU 902 and/or channel state information. The data store 910 may be indexed by UE identifier and/or RRU identifier. This can expedite identification of previously communicated scheduling information for the UE and for monitoring network conditions (e.g., number of UEs allocated to an RRU or antenna element of an RRU).

In addition to providing the scheduling information to the UE, the scheduling information may be used to configure the RRU 990. The configuration may include adjusting the first antenna 996 such as by frequency modulation, time modulation, altering transmission power from a power source 992, or adjusting direction, tone allocation, or beamforming of the transmission.

As discussed above, a variety of different UEs can wirelessly communicate with serving nodes in a cooperative MIMO network. An example UE will be discussed with reference to FIG. 10.

Figure 10:
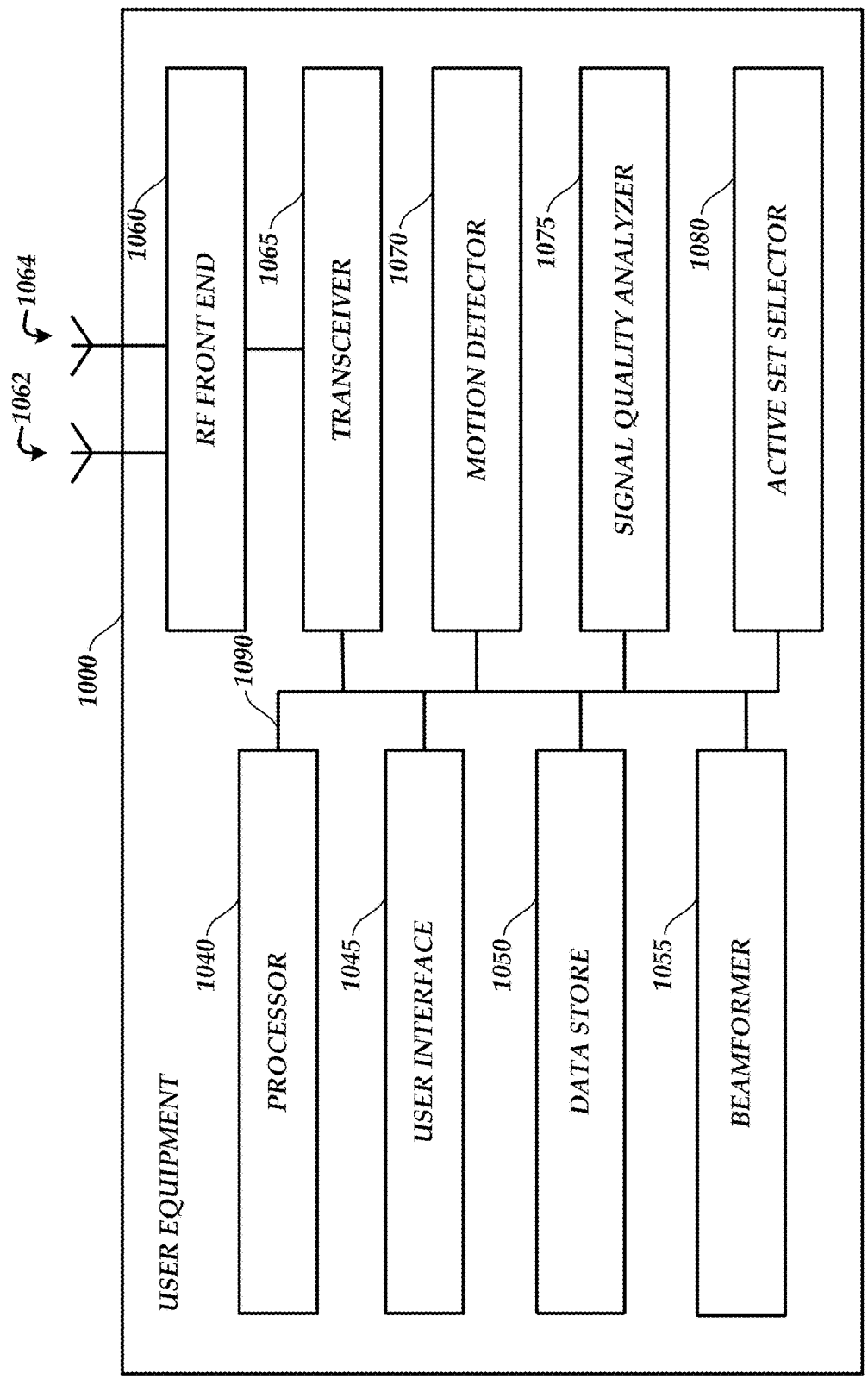
FIG. 10 is a schematic block diagram of an example UE according to an embodiment.

FIG. 10 is a schematic block diagram of an example UE 1000 according to an embodiment. The UE 1000 is configured for wirelessly communicating with a base station in a cooperative MIMO network. As illustrated in FIG. 10, the UE 1000 includes a processor 1040, a user interface 1045, a data store 1050, a beamformer 1055, antennas 1062 and 1064, a transceiver 1065, a motion detector 1070, a signal quality analyzer 1075, and an active set selector 1080. Some other UEs can include additional elements and/or a subset of the elements illustrated in FIG. 10.

The UE 1000 includes a plurality of antennas 1062 and 1064. Any suitable number of antennas can be included for wireless communication. The UE 1000 can include one or more arrays of antennas. A radio frequency (RF) front end 1060 can process RF signals received via the antennas 1062 and 1064. The RF front end can also provide RF signals to the antennas 1062 and 1064 for transmission. The transceiver 965 includes a transmitter and a receiver. The transceiver 1065 can provide processing for transmitting and receiving RF signals associated with the antennas 1062 and 1064. For example, upon receiving active set data, the processor 1040 can configure the transceiver 1065 (e.g., receiver) to receive DL data associated with the spatial beam(s) identified in the active set data as being selected to serve the UE 1000.

The processor 1040 is in communication with the transceiver 1065. The processor 1040 is implemented by physical hardware arranged to perform specific operations to implement functionality related to determining a link strength of spatial beams over which beam pilots and/or user data are transmitted. The processor 1040 can determine the link strength, identify a spatial beam that provides the best link strength, and/or generate one or more messages to report the link strength to a serving node in accordance with any suitable principles and advantages disclosed herein. The processor 1040 can cause active set and neighbor set data to be stored and updated. The processor 1040 can perform any other suitable processing for the UE 1000.

The processor 1040 can be in communication with the motion detector 1070 and the signal quality analyzer 1075. Accordingly, the processor 1040 can receive and process information associated with conditions of the UE 1000. The motion detector 1070 can include any suitable hardware arranged to detect mobility information associated with the UE 1000. The signal quality analyzer 1075 can analyze the quality of signals received and/or transmitted by the antennas 1062 and 1064. This can provide information associated with a spatial channel condition of the UE 1000. The information associated with conditions of the UE 1000 can be provided to the processor 1040 for providing to the serving node(s). In some instances, some or all of the functionality of the motion detector 1070 and/or the signal quality analyzer can be implemented by the processor 1040.

The active set selector 1080 is optional and can identify a desired active set of one or more serving nodes. The active set selector 1080 can select the desired active set based on data associated with one or more of: one or more serving nodes in the active set, one or more serving nodes in the neighbor set, mobility data associated with the UE 1000, a spatial channel condition associated with the UE 1000, the link strength and/or the link quality of one or more spatial beams served by one or more serving nodes, or one or more characteristics of the UE 1000. The active set selector 1080 can optionally execute the active set management scheme to identify a desired active set. The active set selector 1080 can cause the processor 1040 to generate a message for transmission to a serving node and/or a BBU to request that a selected spatial beam (or selected spatial beams) be added to an active set for the UE 1000 (e.g., request that a selected spatial beam, which may be different than the spatial beam(s) already included in an active set for the UE 1000, be included in an updated active set for the UE 1000). The active set selector 1080 can be implemented by dedicated circuitry and/or circuitry of the processor 1040.

The beamformer 1055 can perform any suitable beamforming functionality for the UE 900. The beamformer 1055 can set and/or adjust one or more parameters associated with receiving and/or transmitting signals associated with the antennas 1062 and 1064 of the UE 1000. The beamformer 1055 can be implemented by dedicated circuitry and/or circuitry of the processor 1040.

The UE 1040 includes a data store 1050. The data store 1050 can store instructions that can be executed by the processor 1040 to implement the features described herein. The data store 1050 can store active set data and neighbor set data for the UE 1000. The data store 1050 can store spatial beam link strengths and/or link qualities. The data store 1050 can store any other suitable data for the UE 1000. The data store 1050 can include any suitable memory elements arranged to store data.

Several elements included in the UE 1000 may be coupled by a bus 1090. The bus 1090 can be a data bus, communication bus, other bus, or any suitable combination thereof to enable the various components of the UE 1000 to exchange information.

As illustrated in FIG. 10, the UE 1000 also includes a user interface 1045. The user interface 1045 can be any suitable user interface, such as a display and/or an audio component. In some instances, the user interface 1045 can include one or more of touch screen capabilities, a button, a knob, a switch, or a slider.

Terminology, Applications, and Conclusion

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

As used herein a "transmit-receive point" (TRP) (which can alternatively be referred to as a transmission reception point) may refer to a transceiver device or one transceiver element included in a device. When included as a transceiver element, the device may include multiple TRPs. The TRP may include one or more antennas which are coupled to signal processing circuitry. The signal processing circuitry may be included in the device. The TRP may include additional elements to facilitate transmission or receipt of wireless signals for one or more UEs. Example of such elements may include a power source, amplifier, digital-to-analog converter, analog-to-digital converter, or the like. When a TRP is allocated, such as by a BBU, to provide service to a UE, the TRP may be said to be a "serving node" for the UE.

As used herein a "remote radio unit" (RRU) may refer to a device for controlling and coordinating transmission and receipt of wireless signals for one or more UEs. An RRU may include or be coupled with one or more TRPs. The RRU may receive signals from the TRP and include the signal processing circuitry. The signal processing circuitry may be selectively operated to facilitate processing of signals associated with different TRPs.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A network system comprising:
   a plurality of receive antenna elements of one or more serving nodes; and
   a scheduler in communication with the plurality of receive antenna elements, the scheduler comprising a processor and computer-executable instructions, wherein the computer-executable instructions, when executed by the processor, cause the scheduler to:
   obtain uplink channel information for channels between the plurality of receive antenna elements and a plurality of transmit antenna elements associated with a plurality of user equipment (UEs);
   determine, for each transmit antenna element in the plurality, a channel strength based on the uplink channel information;
   order the plurality of transmit antenna elements based on the determined channel strengths; and
   in order from highest-ordered transmit antenna element to lowest-ordered transmit antenna element, select the respective transmit antenna element to communicate with one or more of the plurality of receive antenna elements during a first time slot in response to a determination that:
   a measurement that represents a spatial orthogonality between the respective transmit antenna element and one or more spatial elements of one or more other transmit antenna elements in the plurality selected to communicate with one or more of the plurality of receive antenna elements is greater than a threshold value, and
   a number of spatial dimensions provided by one or more transmit antenna elements in the plurality selected to communicate with one or more of the plurality of receive antenna elements does not exceed a number of receive antenna elements in the plurality of receive antenna elements.

2. The network system of claim 1, wherein the computer-executable instructions, when executed, further cause the scheduler to determine the threshold value based on channel coefficients of a channel associated with the highest-ordered transmit antenna element.

3. The network system of claim 2, wherein the computer-executable instructions, when executed, further cause the scheduler to determine the threshold value based on a constant value that is the same for all transmit antenna elements in the plurality.

4. The network system of claim 2, wherein the computer-executable instructions, when executed, further cause the scheduler to periodically determine the threshold value based on a constant value that changes based on a block error rate performance associated with at least one transmit antenna element in the plurality.

5. The network system of claim 2, wherein the computer-executable instructions, when executed, further cause the scheduler to determine the threshold value based on a constant value that is different for transmit antenna elements in the plurality.

6. The network system of claim 5, wherein the constant value for a first transmit antenna element in the plurality of transmit antenna elements is based on interference between the first transmit antenna element and one or more other transmit antenna elements in the plurality.

7. The network system of claim 1, wherein the computer-executable instructions, when executed, further cause the scheduler to obtain the uplink channel information for the channels from one or more of the plurality of transmit antenna elements.

8. The network system of claim 1, wherein the computer-executable instructions, when executed, further cause the scheduler to obtain the uplink channel information for the channels based on one or more uplink pilot signals.

9. The network system of claim 1, wherein the computer-executable instructions, when executed, further cause the scheduler to order the plurality of transmit antenna elements based on at least one of the determined channel strengths, latency priority, spectral efficiency, average throughput of the plurality of transmit antenna elements over a threshold period of time, or normalized throughput of the plurality of transmit antenna elements over the threshold period of time.

10. The network system of claim 1, wherein the computer-executable instructions, when executed, further cause the scheduler to select the respective transmit antenna element to communicate with one or more of the plurality of receive antenna elements for one of a resource block, two or more resource blocks, or a frequency band of a carrier.

11. A computer-implemented method comprising:
obtaining uplink channel information for channels between the plurality of receive antenna elements and a plurality of transmit antenna elements associated with a plurality of user equipment (UEs);
determining, for each transmit antenna element in the plurality, a channel strength based on the uplink channel information;
ordering the plurality of transmit antenna elements based on the determined channel strengths; and
in order from highest-ordered transmit antenna element to lowest-ordered transmit antenna element, selecting the respective transmit antenna element to communicate with one or more of the plurality of receive antenna elements during a first time slot in response to a determination that a measurement that represents a spatial orthogonality between the respective transmit antenna element and one or more spatial elements of one or more other transmit antenna elements in the plurality selected to communicate with one or more of the plurality of receive antenna elements is greater than a threshold value.

12. The computer-implemented method of claim 11, further comprising determining the threshold value based on channel coefficients of a channel associated with the highest-ordered transmit antenna element.

13. The computer-implemented method of claim 12, wherein determining the threshold value further comprises determining the threshold value based on a constant value that is the same for all transmit antenna elements in the plurality.

14. The computer-implemented method of claim 12, wherein determining the threshold value further comprises periodically determining the threshold value based on a constant value that changes based on a block error rate performance associated with at least one transmit antenna element in the plurality.

15. The computer-implemented method of claim 12, wherein determining the threshold value further comprises determining the threshold value based on a constant value that is different for transmit antenna elements in the plurality.

16. The computer-implemented method of claim 15, wherein the constant value for a first transmit antenna element in the plurality of transmit antenna elements is based on interference between the first transmit antenna element and one or more other transmit antenna elements in the plurality.

17. The computer-implemented method of claim 11, wherein obtaining uplink channel information further comprises obtaining the uplink channel information for the channels from one or more of the plurality of transmit antenna elements.

18. The computer-implemented method of claim 11, wherein obtaining uplink channel information further comprises obtaining the uplink channel information for the channels based on one or more uplink pilot signals.

19. The computer-implemented method of claim 11, wherein ordering the plurality of transmit antenna elements ordering the plurality of transmit antenna elements based on at least one of the determined channel strengths, latency priority, spectral efficiency, average throughput of the plurality of transmit antenna elements over a threshold period of time, or normalized throughput of the plurality of transmit antenna elements over the threshold period of time.

20. Non-transitory, computer-readable storage media comprising computer-executable instructions, wherein the computer-executable instructions, when executed by a scheduler in a baseband unit, cause the baseband unit to:
obtain uplink channel information for channels between the plurality of receive antenna elements and a plurality of transmit antenna elements associated with a plurality of user equipment (UEs);
determine, for each transmit antenna element in the plurality, a channel strength based on the uplink channel information;
order the plurality of transmit antenna elements based on the determined channel strengths; and
in order from highest-ordered transmit antenna element to lowest-ordered transmit antenna element, select the respective transmit antenna element to communicate with one or more of the plurality of receive antenna elements during a first time slot in response to a determination that a measurement that represents a spatial orthogonality between the respective transmit antenna element and one or more spatial elements of one or more other transmit antenna elements in the plurality selected to communicate with one or more of the plurality of receive antenna elements satisfies a threshold value.

* * * * *